United States Patent [19]

Shimizu

[11] Patent Number: 4,491,909
[45] Date of Patent: Jan. 1, 1985

[54] DATA PROCESSING SYSTEM HAVING SHARED MEMORY

[75] Inventor: Yutaka Shimizu, Yamato, Japan

[73] Assignee: International Business Machines Corporation, Armonk, N.Y.

[21] Appl. No.: 350,795

[22] Filed: Feb. 22, 1982

[30] Foreign Application Priority Data

Mar. 18, 1981 [JP] Japan .................. 56-38029

[51] Int. Cl.³ .................. G06F 13/00; G06F 13/06
[52] U.S. Cl. .................. 364/200
[58] Field of Search ... 364/200 MS File, 900 MS File

[56] References Cited

U.S. PATENT DOCUMENTS

| | | | |
|---|---|---|---|
| 4,153,934 | 5/1979 | Sato | 364/200 |
| 4,200,930 | 4/1980 | Rawlings et al. | 364/200 |
| 4,204,251 | 5/1980 | Brudevold | 364/200 |
| 4,212,057 | 7/1980 | Devlin et al. | 364/200 |
| 4,335,426 | 6/1982 | Maxwell et al. | 364/200 |
| 4,376,982 | 3/1983 | Bantz et al. | 364/200 |
| 4,378,588 | 3/1983 | Katzman et al. | 364/200 |
| 4,394,734 | 1/1983 | Norgren et al. | 364/200 |
| 4,400,771 | 8/1983 | Suzuki et al. | 364/200 |
| 4,414,624 | 11/1983 | Summer, Jr. et al. | 364/200 |

Primary Examiner—Joseph F. Ruggiero
Assistant Examiner—Gary V. Harkcom
Attorney, Agent, or Firm—Homer L. Knearl

[57] ABSTRACT

In a data processing system, data is transferred between a plurality of functional devices through a shared memory without the intervention of the processor. The data transfer is controlled by a Shared Memory Access Channel (SMAC) having a pointer table storing memory addresses to control shared memory accesses and by the functional devices using device addresses, pointer identifers, indicating the pointer to be used from the pointer table, and control codes. The control codes used in the transfer include a Post code (P code), an Available code (A code) and an End of Process Code (E code). The device, from which data is transferred, is referred to as the upstream device, and the device to which data is transferred is referred to as the downstream device. The P code tells the downstream device that the upstream device has written a predetermined amount of data into a shared buffer area in the memory. The A code tells the upstream device that space is available in the buffer area for writing data to be transferred to the downstream device. The E code tells the downstream device that the data transfer operation from the upstream device has been completed.

6 Claims, 18 Drawing Figures

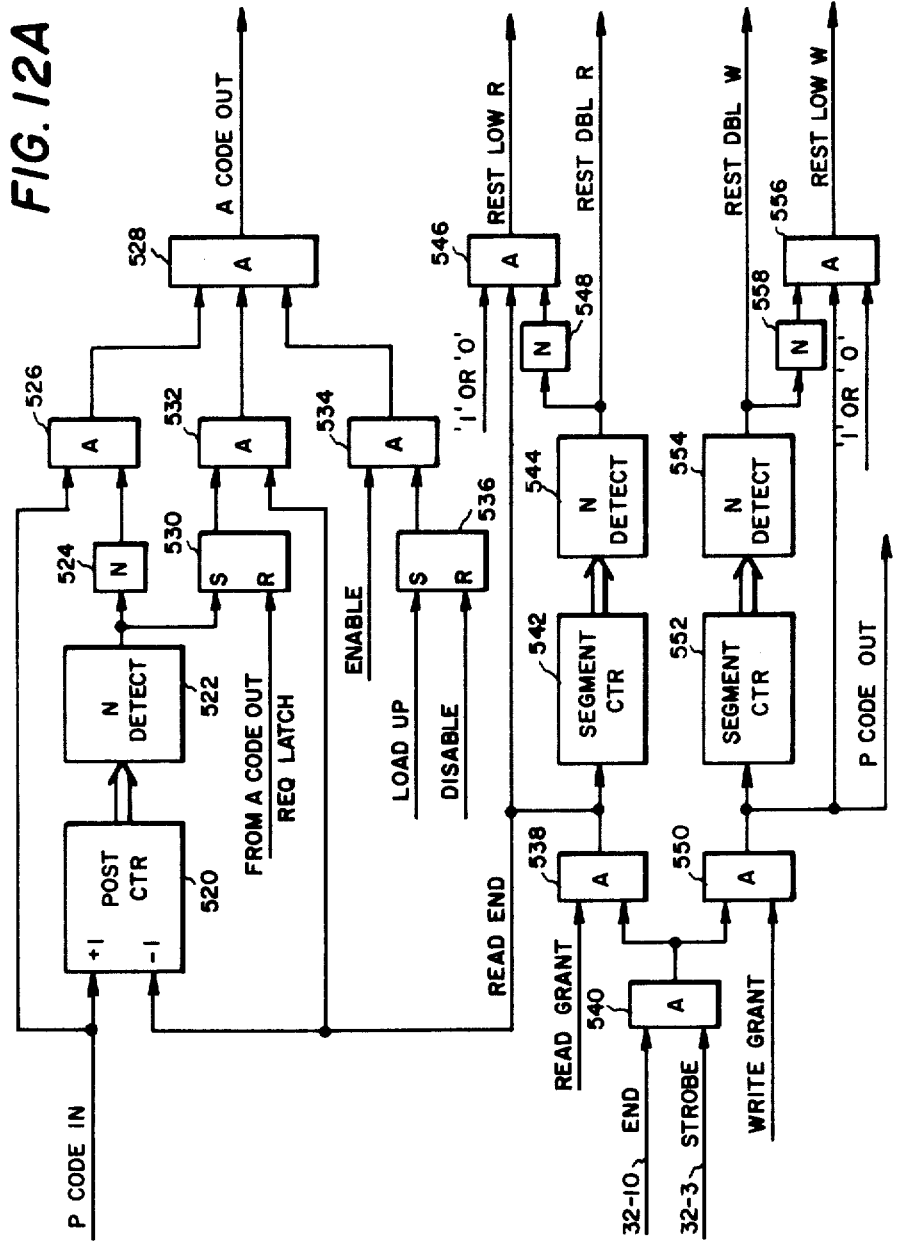

DATA PROCESSING SYSTEM HAVING SHARED MEMORY

CROSS REFERENCES TO RELATED APPLICATIONS

Application Ser. No. 220,637, filed Dec. 29, 1980 for "Shared Memory System With Access by Specialized Peripherals Managed by Controller Initialized by Supervisory CPU" by K. A. Bushaw and M. H. Woodward, now U.S. Pat. No. 4,454,575 and Application Ser. No. 241,902, filed Mar. 9, 1980 for "Mode-Selectable Peripheral Processing Controller" by K. A. Bushaw, M. H. Woodward and D. P. Rackley, which are assigned to the same assignee as this application, show alternate shared memory systems for the system disclosed herein.

FIELD OF THE INVENTION

The present invention relates to a data processing system having a shared memory. More particularly, the invention relates to a data processing system wherein a plurality of functional devices controlled by a processor interchange information directly through a shared memory of a random access type.

BACKGROUND OF THE INVENTION

Typical prior art techniques, wherein data is transferred directly between one or more functional devices such as terminals and a main memory of the system, include cycle steal and direct memory access (DMA). In the cycle steal technique, I/O data is transferred by stealing a memory cycle of a processor. An address counter and a data transfer bus are shared by the processor and the devices. Therefore, in the cycle steal technique, little hardware has to be added, but a problem of conflict in the use of the bus remains.

On the other hand, in the DMA technique, the I/O data is transferred through an additional data bus separate from a Processor Input/Output (PIO) bus which is used for transferring device addresses, I/O commands, I/O interrupt requests, etc. Also, an additional address counter is usually employed instead of the processor address counter. The DMA control circuit including such an address counter has been conventionally located in a functional device, but as the number of connected functional devices is increased, it is desirable that all the functional devices are controlled by a shared memory access control circuit as disclosed, for example, in Japanese Published Unexamined Patent Application No. 52-117536.

Further, Japanese Published Unexamined Patent Applications No. 52-20729, 52-79629 and 54-5637, disclose memory addressing wherein a pointer table capable of retaining a plurality of memory addresses is provided and a memory is addressed by accessing a certain entry of the pointer table using an assigned entry identifier, and loading its content or memory address into an address counter.

However, in any of these prior art techniques, the processor executes every data transfer from a functional device to the memory or from the memory to the functional device. Therefore, when successive transfer operations are required in which a certain functional device writes its data into the memory and then a different functional device reads the same data out of the memory, the processor has to issue a command for both transfers. Systems, in which such successive transfer operations are repeatedly required, include facsimile systems, for example. When the facsimile system transmits image data, the image data is first written into a buffer memory and then read out to a compressor, where the data is compressed according to a given algorithm. The compressed data is then written into the buffer memory. Finally, the compressed data in the buffer memory is read out to a communication device from which the data is transmitted to a remote facsimile system or a store-and-forward apparatus. In a receive operation, the data is transferred sequentially from the communication device to the buffer memory, then from the buffer memory to a decompressor, then from the decompressor to the buffer memory, and finally from the buffer memory to a printer.

In a program controlled facsimile system, if the data transfer starting from the scanner and ending at the communication device and the data transfer starting from the communication device and ending at the printer can be performed without the intervention of the processor, it is apparent that total transfer time would be shortened and the load on the processor would be reduced. This is also true for other data processing systems where data transfers between I/O adapters or terminal units are required.

SUMMARY OF THE INVENTION

In the data processing system of the present invention, data is transferred between a plurality of functional devices through a shared memory without the intervention of the processor. The processor is required only for initialization and error recovery. The data transfer is accomplished by using a Shared Memory Access Channel (SMAC) having a pointer table capable of retaining a plurality of memory addresses to control Shared Memory Accesses (SMA's) by the functional devices and by interchanging specific control information between the functional devices using device addresses sent from the processor at the time of initialization.

The data processing system according to the present invention comprises a processor of the stored program type, a random access memory serving as main memory and data buffer, a plurality of functional devices sharing the memory and controlled by the processor, and a SMAC controlling memory accesses by the functional devices. The processor communicates with each of the functional devices through a PIO bus. The data transfer between the random access memory and each of the functional devices is performed under the control of the SMAC through an SMA bus which is separate from the PIO bus.

The SMAC includes a plurality of Channel Pointer Registers (CPR's) forming a pointer table capable of retaining a plurality of memory addresses, and an address counter into which a memory address is loaded from a selected CPR. When the data transfer between the functional devices is to be started, the processor initializes the pointer table and the functional devices involved in the data transfer. Then it issues a functional device enabling command to each of the involved functional devices. Thereafter, the processor is released from controlling the data transfer and may perform other operations such as monitoring. The functional devices transfer the data between themselves through the SMA bus and a specified buffer area in the memory under the control of the SMAC after being initialized by the processor. Each of the functional devices involved in the data transfer generates an end of process signal when all the necessary operations within it are completed. The processor resets various circuits in each of the functional devices generating this signal by issuing a Disable command.

In the initialization of the pointer table, available CPR's and buffer areas are selected as required, and the CPR's are respectively loaded with start addresses of the buffer areas. For example, if data is transferred sequentially between three functional devices, at least four CPR's and two buffer areas are used, and the start address of each buffer area is loaded into two CPR's, i.e., a CPR for reading and a CPR for writing.

In the initialization of the functional devices, identifiers for the selected CPR's and for path information, which defines the flow of data transfer, are sent to the respective functional devices involved. At least one distinct CPR is assigned to each of the functional devices. For path information, device addresses may be used as the identifiers of the functional devices involved in the device-to-device data transfer. The processor sends a device address of a functional device to another functional device to or from which the data is to be transferred. For example, if the data is transferred from a first functional device to a second functional device through a specified buffer area in the memory, the device address of the first functional device is sent to the second functional device while the device address of the second functional device is sent to the first functional device. These device addresses are used to interchange control codes, described hereinafter, between the functional devices.

The first functional device from which the data is transferred is hereinafter referred to as an upstream device. The upstream device receives the device address of the downstream device and the identifier for the CPR containing the start address of the specified buffer area. The downstream device receives the device address of the upstream device and the identifier of another CPR containing the same start address of the specified buffer area. If three functional devices are involved in the device-to-device data transfer, initializations similar to the above are performed.

When an Enable command is received from the processor, the respective functional devices perform the device-to-device data transfer without the intervention of the processor by using the device addresses to interchange the control codes with each other. The control codes include:

Post code (hereinafter referred to as P code) for informing the downstream device that the upstream device has written a predetermined amount of data into the specified buffer area;

Available code (hereinafter referred to as A code) for informing the upstream device that there still remains an available space in the buffer area for writing data to be transferred to the downstream device; and End of Process code (hereinafter referred to as E code) for informing the downstream device that all the transfer operations of the upstream device have been completed.

The last E code is also used to interrupt the processor.

The upstream device writes data into the buffer area only when it has received the A code from the downstream device. The downstream device reads the data from the buffer area only when it has received the P code from the upstream device. Thus, the data transfer is controlled by interchanging the A and P codes between the functional devices so that no overflow occurs in the buffer areas.

When the upstream device is to write data into a specified buffer area in the memory or the downstream device is to read the data out of the specified buffer area, the device sends to the pointer table in the SMAC the identifier of the CPR assigned to the upstream device. At this time, a signal specifying a memory read or write, along with a data byte in the case of memory write, is sent to the SMAC. The content of a selected CPR in the pointer table, i.e., a memory address is read out to the address counter and then sent to the memory. The memory address read out to the address counter is returned to the same CPR after being incremented by one. Further, the content of the address counter is supplied to a boundary detector provided in the SMAC in order to determine whether a predetermined amount of data has been written into or read out of the buffer area.

The boundary detector determines whether reading or writing of the predetermined amount of data has been completed by comparing the memory address from the address counter with a boundary check code sent from the functional device performing the reading or writing. If completed, the boundary detector sends an end signal to the functional device. The upstream device can generate the P code only when it has recieved the end signal.

The manner, in which the boundary check code is set, is arbitrary. It may be provided from the processor to each of the functional devices involved at the time of initialization, or in case it is fixed, it may be preset in each of the functional devices or in the boundary detector.

BRIEF DESCRIPTION OF DRAWINGS

The invention is described in detail below with reference to drawings, illustrating specific embodiments of the invention, in which:

FIGS. 12A and 12B are block diagrams illustrating in detail request generating circuit 504 in FIG. 11.

DETAILED DESCRIPTION

Figure 1:
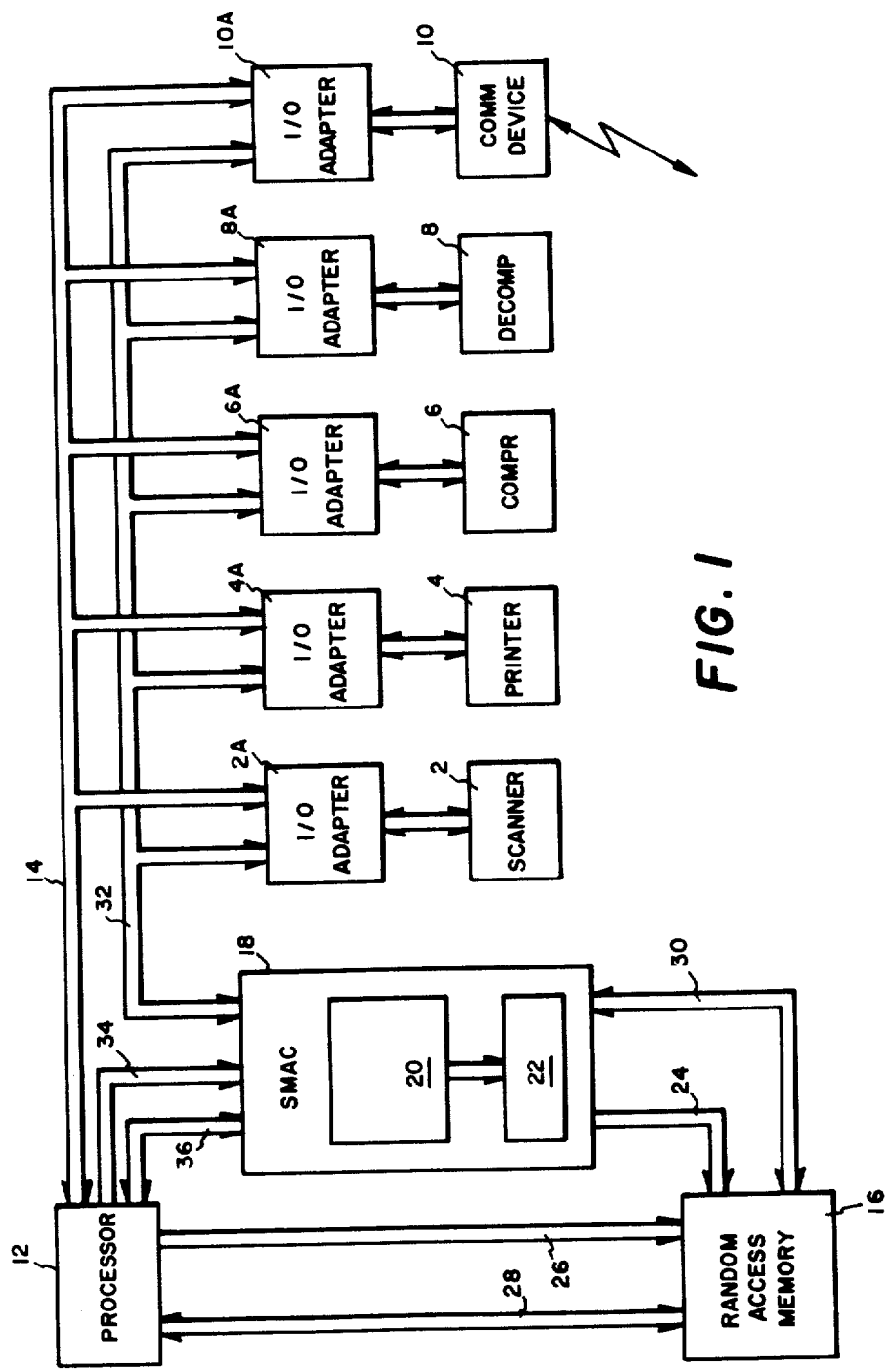
FIG. 1 is a block diagram of a facsimile system incorporating the present invention.

FIG. 1 illustrates a program controlled facsimile system configured according to the present invention. Functional devices include scanner 2, printer 4, compressor 6, decompressor 8, and communication device 10. These devices are connected to processor 12 through respective I/O adapters 2A through 10A and PIO bus 14. Of course, other devices such as a character generator, an optical character recognition unit and an optical mark reader may also be connected.

Random access memory 16 serving as a main memory of the system and also as a data buffer for use in transferring data between the functional devices is shared by processor 12 and functional devices 2 through 10. SMAC (shared memory access channel) 18 controlling the sharing of memory 18 by functional devices 2 through 10 includes pointer table 20 comprising a plurality of CPR's channel pointer registers) capable of retaining memory addresses, and address counter 22 into which the content of a selected CPR, i.e., a memory address, is loaded.

Pointer table 20 is read out to address counter 22 when memory 16 is to be accessed or a table restore operation described hereinafter is to be performed. When memory 16 is accessed, the content of address counter 22 is sent to memory 16 through SMAC address bus 24 and also returned to the selected CPR after being incremented by one. The incrementation of address counter 22 is inhibited during the table restore operation. Processor 12 can directly access memory 16 by using processor address bus 26 and processor data bus 28. SMAC data bus 30 is used to transfer data between one of the functional devices, for example scanner 2, and memory 16 under the control of SMAC 18.

Functional devices 2 through 10 are connected in parallel to SMAC 18 by means of SMA bus 32. The communication between the functional devices and the communication between SMAC 18 and a particular functional device are all performed via SMA bus 32.

Table address bus 34 and table data bus 36 are used when processor 12 accesses pointer table 20. In response to a request (interruption) of device-to-device data transfer received from a particular functional device via PIO bus 14, processor 12 outputs an identifier of an available CPR, i.e. a table address to pointer table 20, on table address bus 34 and simultaneously a start address of a buffer area on table data bus 36. The start address is loaded into the CPR specified by the table address.

Table data bus 36 is bidirectional like other data buses 28 and 30, and processor 12 can, therefore, read the content of a particular CPR via table data bus 36. This reading is performed when a memory address should be fetched to processor 12 because an error occurred.

In FIG. 1, separate data buses 28, 30 and 36 are shown, but they may be replaced by a single time-shared data bus. Similarly, address buses 24, 26 and 34 may be replaced by a single time-shared address bus. Priority control for handling conflicts between these buses may be accomplished in a conventional manner. In that case, it is desirable that processor 12 accesses memory 16 with a higher priority than SMAC 18.

Briefly explaining basic operations of the facsimile system of FIG. 1, processor 12 establishes two buffer areas in memory 16 and loads their start addresses into pointer table 20. In a facsimile transmit operation for the system, a transfer from scanner 2 to a first buffer area, a transfer from the first buffer area to compressor 6, a transfer from compressor 6 to second buffer area, and a transfer from the second buffer area to communication device 10 are sequentially performed. Similarly, in a receive operation, transfers from communication device 10 through decompressor 8 to printer 4 are performed by using these buffer areas.

The transfer sequence is not fixed. For example, if compressor 6 is busy when data scanned by scanner 2 have been written into the first buffer area in the transmit operation, writing into the first buffer area may be followed by reading from the second buffer area into communication device 10. This is also true in the receive operation. Since scanner 2, printer 4, compressor 6, decompressor 8 and communication device 10 per se are well known in the art, details thereof are not described here.

As explained later in detail, the present invention allows the data transfer from scanner 2 up to communication device 10 and the data transfer from communication device 10 up to printer 4 to be performed without the intervention of processor 12 by interchanging the P and A codes between the functional devices via SMA bus 32. In a local copy operation, the data scanned by scanner 2 is transferred to printer 4 through memory 16. When the present invention is applied to a conventional data processing system, various I/O units or terminals instead of scanner 2, printer 4 and so on would be connected to processor 12 and SMAC 18 as the functional devices.

Figure 2:
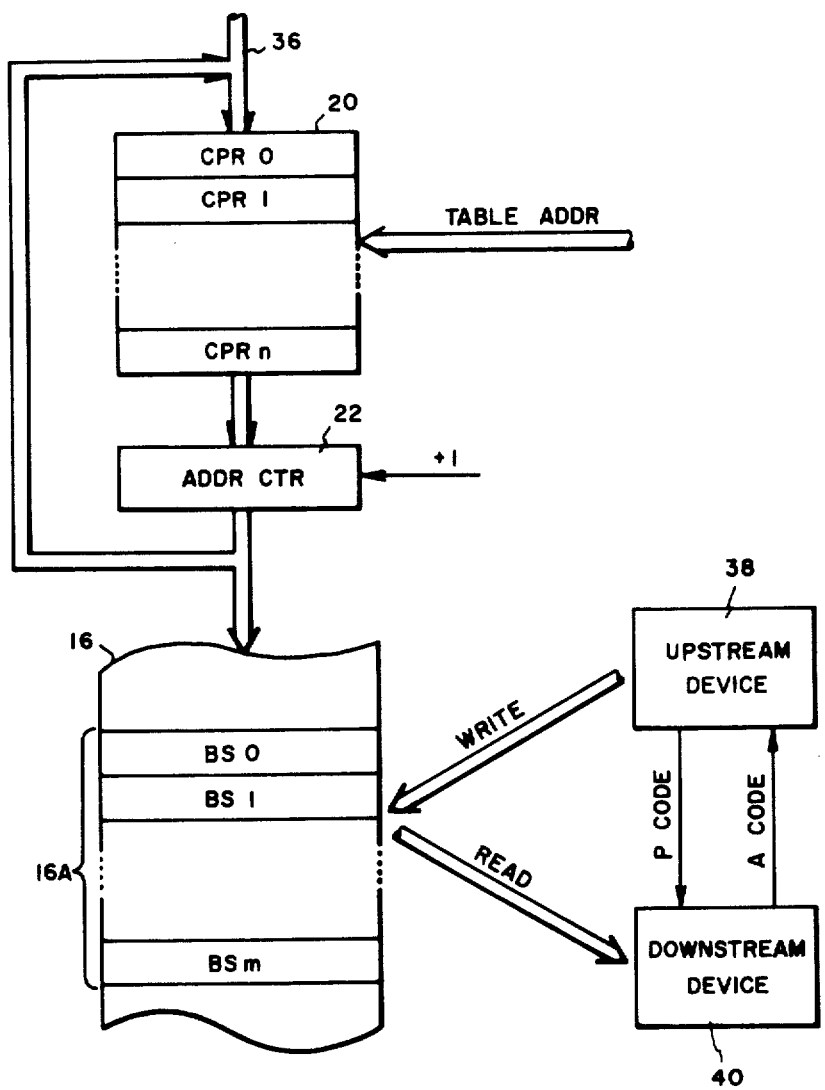
FIGS. 2 and 3 are flow and format diagrams illustrating the operations of the present invention.

Referring now to FIG. 2, the operations of the system according to the present invention will be explained. In the illustrated example, data is transferred from upstream device 38 (e.g. scanner 2) to downstream device 40 (e.g. compressor 6) through buffer area 16A of memory 16. In this example, two CPR's are used for writing and reading by upstream device 38 and by downstream device 40, respectively. In the following explanation, it is assumed that CPR 0 and CPR 1 of pointer table 20 are assigned to upstream device 38 and downstream device 40, respectively.

Processor 12 (FIG. 1) loads a start address of buffer area 16A into CPR 0 and CPR 1 via table data bus 36 during the initialization for the data transfer. CPR 0 and CPR 1 are selected by table addresses provided from processor 12. Further, processor 12 sends the table address of CPR 0 to upstream device 38 and the table address of CPR 1 to downstream device 40 via PIO bus 14. The access to buffer area 16A by upstream device 38 or downstream device 40 becomes possible after the Enable command is received from processor 12.

Upon receipt of the Enable command, downstream device 40 sends the A code (Available code) to upstream device 38. This indicates that writing into buffer area 16 is possible. Upon receipt of the A code from downstream device 40, upstream device 38 sends the table address of CPR 0 to pointer table 20 to cause the start address of buffer area 16A loaded into CPR 0 to be read out to address counter 22. Then, the start address in address counter 22 is sent to memory 16 to select a first location of buffer area 16A into which a first data byte from upstream device 38 is written. The content of address counter 22 is returned to CPR 0 after being incremented by one. Successive data bytes are written in a similar manner.

Buffer area 16A is logically divided into a plurality of buffer segments BS 0 through BS m, and upstream device 38 sends the P code (Post code) to downstream device 40 every time a particular buffer segment has been filled with data. This indicates that reading by downstream device 40 is possible. When the first buffer segment BS 0 has been filled up and downstream device 40 has received the P code from upstream device 38, downstream device 40 can start reading buffer segment BS 0 by sending the table address of CPR 1 to pointer table 20, unless downstream device 40 and memory 16 are busy.

At this time, the last address of buffer segment BS 0 plus one, i.e. the start address of next buffer segment BS 1, has been returned to CPR 0 for use in writing by upstream device 38. Therefore, upstream device 38 can resume the write operation at buffer segment BS 1 after buffer segment BS 0 has been read out by downstream device 40. This write operation is resumed in response to the A code sent from downstream device 40 indicating an available buffer segment exists. In this way, the writing by upstream device 38 and the reading by downstream device 40 are continued without the intervention of processor 12.

SMAC 18 compares the content of address counter 22 with a predetermined boundary check code, representing the capacity of a buffer segment, to determine whether the end of each buffer segment is reached. If the end of the buffer segment has been reached, SMAC 18 sends the end signal to upstream device 38 or downstream device 40 which has accessed the buffer segment. In response to the end signal, upstream device 38 generates the P code.

If the amount of data to be transferred from upstream device 38 to downstream device 40 is larger than the capacity of buffer area 16A, the first buffer segment BS 0 is used again following the last buffer segment BS m. However, when the write (or read) operation of the last buffer segment BS m has been completed, the content of CPR 0 (or CPR 1) has a value of the last address of buffer segment BS m plus one and this value, therefore, must be changed to the start address of buffer segment BS 0. This may be accomplished by providing SMAC 18 with auxiliary resisters paired with the respective CPR's of pointer table 20, loading a selected CPR and its paired auxiliary register with the same start address during the initialization by processor 12, and restoring the content of the auxiliary resister into the paired CPR when an address wraparound from buffer semgent BS m to buffer segment BS 0 is required.

If downstream device 40 does not initiate the read operation when upstream device 38 sends the P code thereto, upstream device 38 may continue its writing into the next buffer segment.

If downstream device 40 does not initiate the read operation for a long time for some reason and buffer area 16A has been filled with the data from upstream device 38, the write operation of upstream device 38 must be stopped in order to prevent the data not yet read by downstream device 40 from being replaced by new data. Since upstream device 38 performs the write operation in response to the A code from downstream device 40, the write operation of upstream device 38 is stopped by causing downstream device 40 not to send the A code when buffer area 16A has been filled with the data. On the other hand, if upstream device 38 does not initiate the write operation for a long time and all the data in buffer area 16A has been read out, the read operation of downstream device 40 must be stopped.

Since (as described hereinafter) each functional device sends a request signal to SMAC 18 every time a data byte is to be transferred and initiates the writing or reading of memory 16 after the request is granted by SMAC 18, the above situations may occur if SMAC 18 does not grant the writing or reading for a long time or the functional device remains busy for a long time.

Each functional device is provided with a post counter as means for stopping the write operation of upstream device 38 or the read operation of downstream device 40. The post counter for downstream device 40 is incremented by one each time it receives the P code from upstream device 38, and decremetned by one each time a buffer segment has been read out by downstream device 40. The content of the post counter is compared with the number of buffer segments (in the illustrated example, m+1) and zero every time it is updated. If the content of the post counter is less than m+1, which means that one or more available segments exist in buffer area 16A, the A code is sent to upstream device 38. If the content of the post counter reaches m+1, this means that buffer area 16A has been filled with the data from upstream device 38. Therefore, downstream device 40 stops the write operation of upstream device 38 by not sending the A code to upstream device 38 when the post counter is incremented to m+1. If the content of the post counter is zero, which means that buffer area 16A contains no data to be read out, generation of a read request is inhibited within downstream device 40.

When the present invention is applied to the facsimile system such as shown in FIG. 1, a special consideration is required in the management of the buffer area. Since processor 12 generally performs binary operations, it is desirable that memory 16 has a capacity of $2^n$ bytes (n is a positive integer) in order to be effectively managed. This is also true for capacities of buffer area 16A and buffer segments BS 0 through BS m. However, in an ordinary facsimile system, the number of scanned data bytes in a single line of a document is not equal to a power of two and, for example, 216 bytes. Therefore, if a line of scanned data bytes are written into each buffer segment which has an optimum capacity of 256 ($2^8$) bytes, each segment contains an unused space of 40 bytes. This means that when the scanned data has been written into a buffer segment and a next buffer segment is to be accessed, the memory address must be skipped by 40 bytes. This situation is illustrated in FIG. 3.

Figure 3:
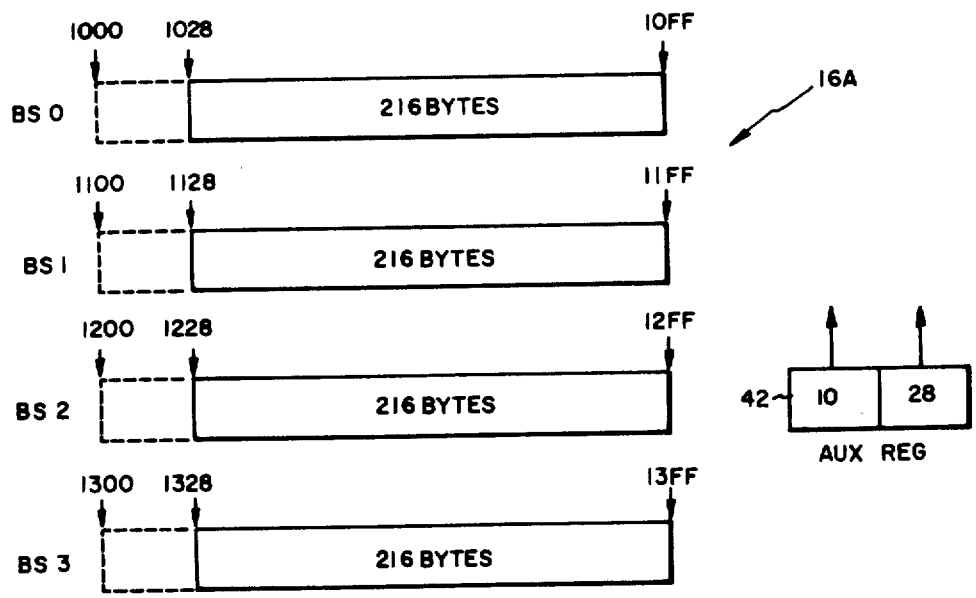
Figure 6:
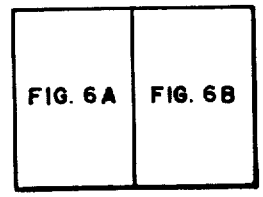
FIG. 6 is a block diagram showing the relation between FIGS. 6A and 6B.

It is assumed that buffer area 16A shown in FIG. 3 consists of four buffer segments BS 0 through BS 3, and 216 bytes of scanned data are written into each buffer segment justified to the right. The three numbers indicated above each buffer segment are hexadecimal numbers representing, from left to right, a start address of each buffer segment, an access start address for actually writing or reading the scanned data, and and end or last address of each buffer segment.

During the initialization, processor 12 loads the CPR's assigned to scanner 2 and compressor 6 with the access start address X'1028' (X means a hexadecimal representation) of buffer area 16A. As explained before, the same address is loaded into auxiliary register 42. When scanner 2 continues to write the scanned data reaching the last address X'10FF' of the first buffer segment BS 0, address counter 22 is incremented by one and then the incremented address X'1100' is returned to the CPR assigned to scanner 2 for writing. X'1100' is the start address of next buffer segment BS 1 but the actual writing is initiated at X'1128'. Therefore, the content of the CPR for scanner 2 must be changed from X'1100' to X'1128'.

Such address changing or restoring is accomplished by a table restore operation using auxiliary register 42. That is, by loading the content X'28' of the lower byte in auxiliary register 42 into a lower byte position of the CPR for scanner 2, the desired address X'1128' is obtained. The same restore operation is also required for the third buffer segment BS 2. When the first buffer segment BS 0 should be accessed again following the last buffer segment BS 3, both bytes of auxiliary register 42 are restored into the CPR for scanner 2, as in the cases of other functional devices. Such a restore operation is also performed when compressor 6 is reading the scanned data from buffer area 16A.

If the capacity of each buffer segment for the scanned data could be 216 bytes, the restore operation for each segment but the last would not be required. However, it is not desirable in view of buffer management that the capacity of each buffer segment be such an odd number of bytes.

Figure 4:
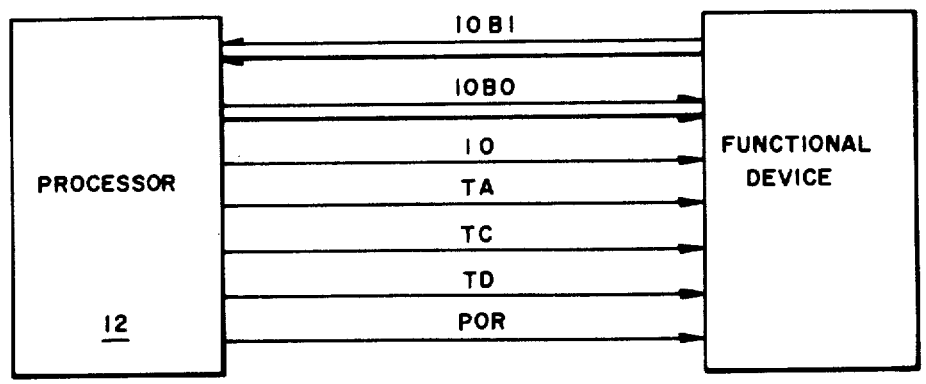
FIG. 4 shows the configuration of the PIO bus.

Each component of the data processing system according to the present invention will be explained in detail next. First, an illustrative configuration of PIO bus 14 is shown in FIG. 4. PIO bus 14 is used to transfer commands, status information, interrupt signals, I/O data and so on between processor 12 and each of the functional devices, and comprises the following buses and control lines.

IO Bus In (IOBI)—An input for transferring status information or data from an addressed functional device to the processor. The IOBI may also be used by any functional device to interrupt the processor. The IOBI may have a width of one byte as well as IOBO explained below.

IO Bus Out (IOBO)—An output bus for transferring address bytes, command bytes, or data bytes from the processor to each of the functional devices. The byte is being transferred is designated by the TA, TC or TD line explained below.

Input/Output Operation Line (IO)—A control line for informing all the functional devices that the processor is executing an input/output instruction. When this IO line becomes active, any functional device issuing an interrupt request on the IOBI must drop the request. Each functional device can issue the interrupt request only when the IO line is inactive.

Address Tag Line (TA)—A tag line for indicating that a byte on the IOBO is an address byte.

Command Tag Line (TC)—A tag line for indicating that a byte on the IOBO is a command byte.

Data Tag Line (TD)—A tag line for indicating that the processor is ready to receive input data from a functional device in a read operation, or the processor has put output data on the IOBO in a write operation.

Power On Reset Line (POR)—A control line for starting a power on reset sequence at all the functional devices connected to the processor. When the POR line is energized, all registers of the functional devices are reset to a particular state, e.g., all 0's.

Figure 5:
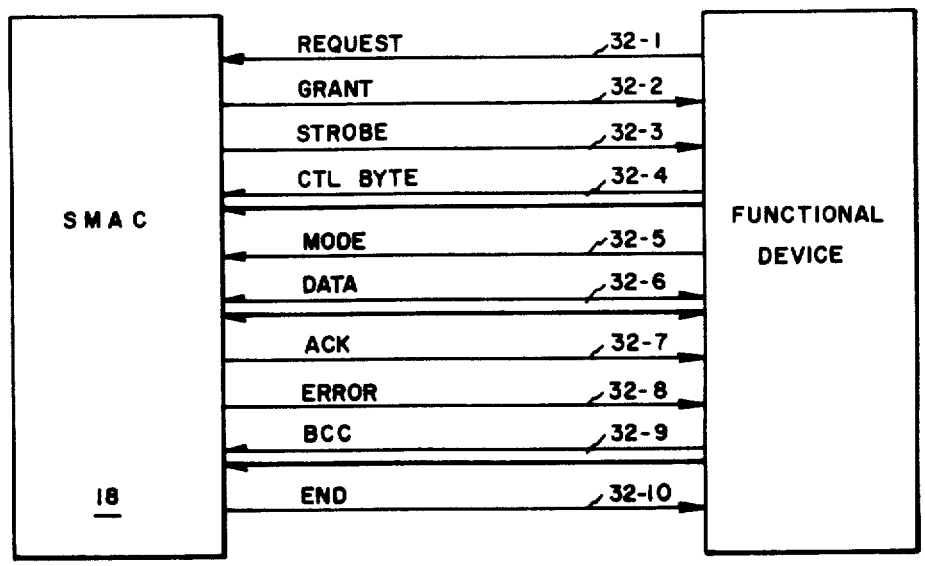
FIG. 5 shows the configuration of the SMA bus.

Although not shown in FIG. 4, a valid byte line may also be included for indicating that an addressed functional device has received a byte of information from the processor via the IOBO or put a byte of information on the IOBI. Further a parity valid line may be included for indicating that a byte on the IOBI has a parity bit. SMA bus 32 provided between all the functional devices and SMAC 18 includes the following lines and buses shown in FIG. 5.

Request Line—A line for informing the SMAC that one or more functional devices needs execution of a SMA cycle. The SMA cycle begins when an SMA request is granted and ends when a transfer of a single byte of information through a data bus, explained below, is completed. In the SMA cycle, either memory data or the aforementioned control code is transferred. Request line 32-1 remains active until a grant signal and a strobe pulse are received from SMAC. If two or more functional devices have issued the SMA request simultaneously, the priority is determined by the connection sequence of the grant line explained below.

Grant Line—A line for informing any functional device which has issued a request that the execution of SMA cycle or use of SMA bus 32 has been granted. Grant line 32-2 is cascaded to each of the functional devices by a daisy-chain technique. If two or more functional devices have issued requests simultaneously, only the first device to receive the grant signal can use the SMA bus 32. The grant signal is dropped at this first functional device and thus not transmitted down the chain to subsequent functional devices.

Strobe Line—A line always energized by the SMAC when the SMA cycle is executed. A granted functional device samples a data bus (in reading the memory), an acknowledgement (ACK) line, an end line, and an error line, all of which are explained below, in response to a strobe pulse on strobe line 32-2. At this time, the functional device may drop the request signal. The strobe pulse is generated near the end of the SMA cycle.

Control Byte Bus—A bus for transferring a byte of control information from the granted functional device to the SMAC. Among bits 0 through 7 of the control byte, bits 2 through 6 represent a CPR identifier (CPR number) assigned during the initialization, and bits 0, 1 and 7 specify various operations shown in the following Table I.

TABLE I

| Bits | | | Operations |
| --- | --- | --- | --- |
| 0 | 1 | 7 | |
| 0 | 0 | X | Read memory |
| 1 | 0 | X | Write memory |
| X | 1 | 0 | (Write CPR high byte) |
| X | 1 | 1 | (Write CPR low byte) |

'X' in Table I represents 'don't care' (either '0' or '1'). The last two codes for writing a memory address from a granted functional device into a particular CPR of the pointer table may be used if cycle stealing functional devices are connected. Since the cycle steal per se is well known in the art and is not pertinent to the device-to-device data transfer of the present invention, details thereof need not be explained here.

Mode Line—A line for switching the SMAC and all the functional devices connected thereto between a data mode and a control mode. They are switched to the control mode when mode line 32-5 is activated but otherwise remain in the data mode. Although each functional device has means for activating mode line 32-5, only the granted functional device actually activates it. In the control mode, the functional device which has activated mode line 32-5 outputs control information on data bus 32-6 explained below. In the data mode, data written into or read out of the memory is transferred via data bus 32-6.

Data Bus—A bidirectional bus comprising eight data lines and one parity line. In the data mode, data bus 32-6 is used to transfer data between memory 16 and the granted functional device, while in the control mode without memory accessing, bits 0 through 4 represent a device address and bits 5 through 7 represent a control code. Table II below shows device address assignments in the system of FIG. 1 wherein five functional devices are connected.

TABLE II
(Device Addresses)

| Data Bus Bits | | | | | |
|---|---|---|---|---|---|
| 0 | 1 | 2 | 3 | 4 | Devices |
| 0 | 0 | 0 | 0 | 0 | SMAC |
| 0 | 0 | 0 | 0 | 1 | Scanner 2 |
| 0 | 0 | 0 | 1 | 0 | Printer 4 |
| 0 | 0 | 0 | 1 | 1 | Compressor 6 |
| 0 | 0 | 1 | 0 | 0 | Decompressor 8 |
| 0 | 0 | 1 | 0 | 1 | Communication Device 10 |
| 0 | 0 | 1 | 1 | 0 | |
| : | | | | | Spare |
| 1 | 1 | 1 | 1 | 1 | |

Bits 5 through 7 of data bus 32-6 in the control mode specify different functions in a functional device-to SMAC transfer and a functional device-to-functional device transfer, respectively, as shown in Tables III and IV below.

TABLE III
(Functional Device to SMAC)

| Bits | | | |
|---|---|---|---|
| 5 | 6 | 7 | Functions |
| 0 | 0 | 0 | Unused |
| 0 | 0 | 1 | Restore CPR low byte |
| 0 | 1 | 0 | Restore CPR double bytes |
| 0 | 1 | 1 | Spare (Restore CPR high byte or Transfer from CPR to auxiliary register may be specified, if desired.) |
| 1 | 1 | 1 | |

TABLE IV
(Functional Device to Functional Device)

| Bits | | | |
|---|---|---|---|
| 5 | 6 | 7 | Functions |
| 0 | 0 | 0 | End of Process (E Code) |
| 0 | 0 | 1 | Post (P Code) |
| 0 | 1 | 0 | Available (A Code) |
| | | | Spare |
| 1 | 1 | 1 | |

The functions in Table III are utilized to perform within the SMAC the table restore operation explained with reference to FIGS. 2 and 3 by using the auxiliary register.

ACK Line—The ACK line is activated by the SMAC or functional device specified by a device address when the device address (bits 0 through 4) and the control code (bits 5 through 7), which have been sent from the granted functional device on data bus 32-6, are valid in the control mode. The granted functional device samples the status of ACK line 32-7 in response to the strobe pulse from the SMAC and, if it has not been activated, interrupts the processor.

Error Line—A line by which the SMAC informs the granted functional device that a parity error has occurred in the data output from the granted functinonal device on data bus 32-6. The status of error line 32-8 is also sampled in response to the strobe pulse. If error line 32-8 has been activated, the processor is interrupted. Of course, the data transfer is terminated at that time.

Boundary Check Code (BCC) Bus—A bus for transferring a BCC, indicating the boundary for buffer segment, from the granted functinonal device to the SMAC. The BCC specifies the boundary of each buffer segment by the number of bytes in the segment. Table V below shows illustrative boundary values specified by the three bit BCC.

TABLE V
(BCC)

| BCC Bits | | | |
|---|---|---|---|
| 0 | 1 | 2 | Boundary Values (Bytes) |
| 0 | 0 | 0 | 16 |
| 0 | 0 | 1 | 32 |
| 0 | 1 | 0 | 64 |
| 0 | 1 | 1 | 128 |
| 1 | 0 | 0 | 256 |
| 1 | 0 | 1 | 512 |
| 1 | 1 | 0 | 1024 |
| 1 | 1 | 1 | 2048 |

In FIG. 3, the BCC is '100'. For flexibility, it is preferable that the BCC is provided from the processor to a particular functional device during the initialization for the device-to-device data transfer. However, the BCC may be fixed in a specific system such as a facsimile system.

End Line—A line by which the SMAC informs the granted functional device that a memory address counter has reached a value corresponding to a boundary value specified by the BCC. The functional device can generate the aforementioned P code upon receipt of the end signal.

Figure 6A:
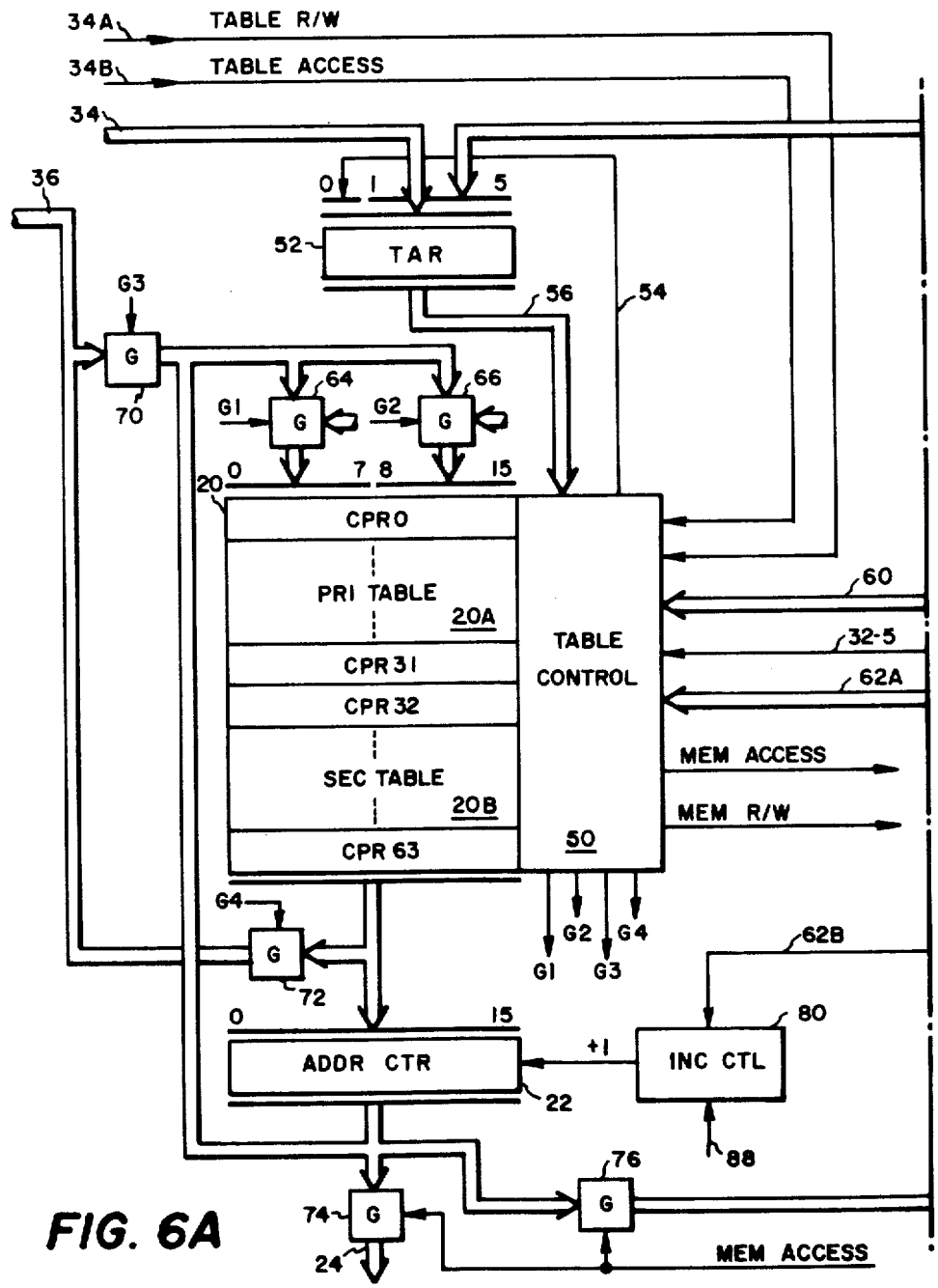
FIGS. 6A and 6B are block diagrams illustrating the SMAC.

Next, referring to FIGS. 6A and 6B, the configuration of SMAC 18 will be explained.

The major portions of SMAC 18 are pointer table 20 and table control 50 for controlling reading, writing and restoring of pointer table 20. Pointer table 20 comprises primary table 20A for memory accessing and secondary table 20B for table restoring. When the granted functional device accesses memory 16, only primary table 20A is used. In this embodiment, each of primary table 20A and secondary table 20B consists of 32 CPR's, each CPR capable of retaining a 16-bit memory address. Each CPR is logically divided into a high byte portion (bits 0 through 7) and a low byte portion (bits 8 through 15).

A table address for selecting a particular CPR is loaded into table address register (TAR) 52 via table address bus 34 from processor 12 or via control byte bus 32-4 (bits 2 through 6) from the granted functional device. Since pointer table 20 consists of 64 CPR's, six bits are sufficient for TAR 52. CPR 0 through CPR 31 form primary table 20A, and CPR 32 through CPR 63 form secondary table 20B. The CPR's forming primary table 20A are hereinafter referred to as primary CPR's, and the CPR's forming secondary table 20B are hereinafter referred to as secondary CPR's. Accordingly, the primary CPR's are specified by table addresses 0 through 31 (000000 through 011111) and the secondary CPR's are specified by table addresses 32 through 63 (100000 through 111111). This assignment of table addresses allows primary table 20A to be accessed when the highest bit of a table address is '0' and secondary table 20B to be accessed when the highest bit is '1'. This is convenient for the management of pointer table 20 by table control 50.

Each of the secondary CPR's corresponds to an auxiliary register 42 shown in FIG. 3 and is paired with a primary CPR having the same table address bits 1 through 5 as those of the secondary CPR. During the initialization of pointer table 20 by processor 12, the same start address is loaded into the paired primary and secondary CPR's.

When the granted functional device accesses pointer table 20, it transfers bits 1 through 5 of the table address. In that case, bit position 0 of TAR 52 is set to '0' or '1' by a bit 0 signal provided from table control 50 via line 54.

Reading, writing and restoring of pointer table 20 are controlled by table control 50. Table control 50 selects a CPR by decoding the table address sent from TAR 52 via bus 56 and, in response to other input signals, sets pointer table 20 to a read or write condition and selectively generates gate control signals G1 through G4, a memory access signal and a memory R/W signal. Further, if the granted functional device is accessing pointer table 20, '0' (primary table access) or '1' (secondary table access) is loaded into bit position 0 of TAR 52 via line 54 prior to a CPR selection. The input signals to table control 50 other than the table address are as follows:

1. A table R/W signal sent from processor 12 via line 34A. When this signal is on, a write operation from processor 12 into pointer table 20 is specified, and when it is off, a read operation of pointer table 20 is specified.
2. A table access signal sent from processor 12 via line 34B. This signal indicates that processor 12 is accessing pointer table 20. Table control 50 accepts the table R/W signal on line 34A only when the table access signal is on.
3. A memory read signal, a memory write signal, a write CPR high byte signal or a write CPR low byte signal (see Table I) sent from control byte decoder 60 via decoder output bus 60A. Each of these signals implies that the granted functional device is accessing pointer table 20.
4. A mode signal sent from the granted functional device via mode line 32-5. When this signal is on, indicating the control mode, table control 50 ignores all the decoder outputs of control byte decoder 60 and accepts decoder outputs of control code decoder 62 explained below.
5. A restore low byte signal or a restore double bytes signal sent from control code decoder 62 via decoder output bus 62A (see Table III). When either signal is on in the control mode, table control 50 causes a low byte or double bytes to be transferred from secondary table 20B to primary table 20A (table restore operation).

Now reviewing in detail the relationship between the input and output signals of table control 50, if the table access signal on line 34B is active, table control 50 either sets pointer table 20 to the write condition and generates gate control signals G1, G2 and G3, or sets pointer table 20 to the read condition and generates gate control signal G4, depending on the state of table R/W signal on line 34A. Thus, a memory address sent out from processor 12 on table data bus 36 is written into pointer table 20 through gate 70, bus 68 and table input gates 64 and 66, or a memory address read out of pointer table 20 is sent to processor 12 through gate 72 and table data bus 36. A CPR to be accessed by processor 12 is selected by a 6-bit table address loaded from processor 12 into TAR 52 via table address bus 34.

If the table access signal and the mode signal are off and the decoder output of control byte decoder 60 indicates a read or write operation of memory 16, table control 50 loads '0' into bit position 0 of TAR 52 via line 54. In bit positions 1 through 5 of TAR 52, a 5-bit CPR number from the granted functional device is loaded. Then, table control 50 sets pointer table 20 to the read condition causing the content of a primary CPR selected by the table address from TAR 52 to be read into address counter 22.

At this time, the memory access signal and the memory R/W signal are also generated. The memory R/W signal indicates the read operation, if on, and the write operation if off. The memory access signal enables gates 74 and 76 to thereby send the memory address in address counter 22 to memory 16 via address bus 24 and also to boundary detector 78. The memory access signal and the memory R/W signal from table control 50 is sent to memory 16, causing memory 16 to be read or written by the granted functional device.

In the write operation, a data byte from the granted functional device is sent to memory 16 through a data transfer control circuit explained below. Then, table control 50 sets pointer table 20 to the write condition and generates gate control signals G1 and G2 after the content of address counter 22 is incremented by one by a +1 signal from increment control circuit 80. Thus, a memory address incremented by one is written into the original primary CPR.

If the output of control byte decoder 60 indicates the writing of CPR high byte or low byte, table control 50 loads '0' into bit position 0 of TAR 52, sets pointer table 20 to the read condition and generates either gate control signal G1 (high byte) or G2 (low byte). At this time, the granted functional device has already put on data bus 32-6 a high byte or a low byte to be loaded into a selected primary CPR through gate 96 and the corresponding table input gate 64 or 66.

If the mode signal on line 32-5 is on and the output of control code decoder 62 indicates the restoring of low byte or double bytes, table control 50 loads '1' into bit position 0 of TAR 52 and sets pointer table 20 to the read condition. Since bit positions 1 through 5 of TAR 52 are loaded with the 5-bit CPR number from the granted functional device, the content of the secondary CPR paired with the primary CPR assigned to the granted functional device is read out to address counter 22. Then, table control 50 loads '0' into bit position 0 of TAR 52, sets pointer table 20 to the write condition, and generates only gate control signal G2 or both G1 and G2 depending on whether the low byte or the double bytes should be restored. Thus, the low byte or double bytes of the secondary CPR in address counter 22 can be restored into the primary CPR paired therewith. As will be explained later, any incrementation of address counter 22 is inhibited in the table restore operation.

Any functional device must first generate an SMA request signal on request line 32-1 before accessing pointer table 20. If a memory not-busy signal on line 84 is active at this time, AND circuit 82 shown in FIG. 6B generates a grant signal on grant line 32-2. The memory not-busy signal on line 84 is provided from memory 16.

The grant signal generated on line 32-2 is also used within SMAC 18. Strobe generator 86 generates a strobe pulse on strobe line 32-3, after a predetermined time has passed from the generation of the grant signal, and at the end of the strobe pulse, generates an increment trigger signal on line 88. Increment control circuit 80 generates a +1 signal in response to the increment trigger signal.

The grant signal on line 32-2 is also applied to control byte input gate 90, parity check input gate 92 and BCC input gate 94 to pass the information on control byte bus 32-4, data bus 32-6 and BCC bus 32-9 into SMAC 18. Control byte input gate 90 passes bits 2 through 6 of control byte bus 32-4 to bit positions 1 through 5 of TAR 52, respectively, and passes bits 0, 1 and 7 to control byte decoder 60.

As shown in Table I, control byte decoder 60 decodes bits 0, 1 and 7 of the control byte and generates on decoder output bus 60A, a memory read signal, a memory write signal, a write CPR high byte signal or a write CPR low byte signal. If either of the last two is generated, control byte decoder 60 also generates a CPR write signal on line 60B. The signals on decoder output bus 60A are provided to table control 50 to cause the aforementioned operations to be performed. The CPR write signal on line 60B enables cycle steal input gate 96 to pass to table input gates 64 and 66 a memory address byte. The memory address byte has been sent from the granted functional device on data bus 32-6.

Parity check input gate 92 passes the information on data bus 32-6 into parity checker 98. Parity checker 98 generates an error signal on error line 32-8 if a parity error is detected, informing the granted functional device that the parity error has occurred. BCC input gate 94, also enabled by the grant signal, passes the BCC sent from the granted functional device on BCC bus 32-9 into boundary detector 78. It should be noted that the granted functional device outputs the BCC only when memory 16 is to be read or written.

In each memory access, boundary detector 78 compares the memory address provided from address counter 22 through gate 76 with the BCC provided from the granted functional device through BCC bus 32-9 and BCC input gate 94. Since the BCC does not represent the memory address as shown in Table V, a direct comparison is not possible. However, if the last address of each buffer segment has been properly chosen, it is possible to detect the buffer segment boundary by comparing several lower bits of the memory address from address counter 22 with a binary representation of the boundary value specified by the BCC.

Referring again to FIG. 3, eight lower bits of each last address of buffer segments BS 0 through BS 3 are '11111111' (X'FF'). Since the BCC in this case is '100' specifying 256 ($2^8$) bytes, eight 1's (or 0's) are generated within boundary detector 78 when the above BCC is received, and then compared with the eight lower bits of the memory address. In general, the above comparison may be simply done if the number of bytes specified by the BCC is $2^n$ and n lower bits of the last address of each buffer segment are all 1's or 0's.

When the boundary of each buffer segment is reached, boundary detector 78 generates the end signal on line 32-10. The granted functional device generates the P code only when it has received the end signal. A table restore request may also be generated at this time.

If the granted functional device has requested a memory access, the data transfer between the granted functional device and memory 16 is controlled by the data transfer control circuit consisting of inverter 100, AND circuit 102, write gate 104, and read gate 106. Table control 50 supplies the memory access signal to one input of AND circuit 102 and the memory R/W signal to inverter 100 and read gate 106. Accordingly, when the memory R/W signal is off, specifying the write operation, AND circuit 102 is conditioned to enable write gate 104. Thus, a data byte sent out on data bus 32-6 from the granted functional device is passed to memory 16 through write gate 104 and SMAC data bus 30. When the memory R/W signal is on, specifying the read operation, read gate 106 is enabled to perform a data transfer in a reverse direction. In any case, the memory address is sent from address counter 22 to memory 16 through gate 74.

As explained before, SMAC 18 operates either in the data mode or in the control mode like other functional devices, and enters the control mode when the mode signal is generated on mode line 32-5. A functional device generating the mode signal outputs a device address (bits 0 through 4) and a control code (bits 5 through 7) on data bus 32-6. Gate 108 passes the device address to address comparator 110 and the control code to gate 112 in response to the mode signal on line 32-5. Address comparator 110 compares the received device address with the address of SMAC 18 and generates an equal signal when they are equal to each other. Assuming that the address of SMAC 18 is '00000' as shown in Table II, address comparator 110 may be an all zero detector. Since the outputs of gate 108 are all zeros in the data mode, address comparator 110 would always generate the equal siganl in the data mode to enable gate 112. However, the control code '000' passed to control code decoder 62 of SMAC 18 is an invalid code as shown in Table III and, hence, control code decoder 62 does not generate any output.

When address comparator 110 generates the equal signal in the control mode, gate 112 is enabled to pass bits 5 through 7 of data bus 32-6 to control code decoder 62. Control code decoder 62 decodes these bits in accordance with Table III and generates a low byte restore signal or a double byte restore signal on decoder output bus 62A and an increment inhibit signal on line 62B.

The increment inhibit signal is applied to increment control circuit 80 so as to prevent address counter 22 from being incremented during the table restore operation. Control code decoder 62 further generates a valid code signal on line 62C if the control code received is valid. AND circuit 116 is conditioned by the equal signal from address comparator 110 and the valid code signal from control code decoder 62 to thereby activate ACK line 32-7. The functional device which has sent the device address and the control code on data bus 32-6 can proceed to the next operation only when the ACK signal is recieved.

Figure 7:
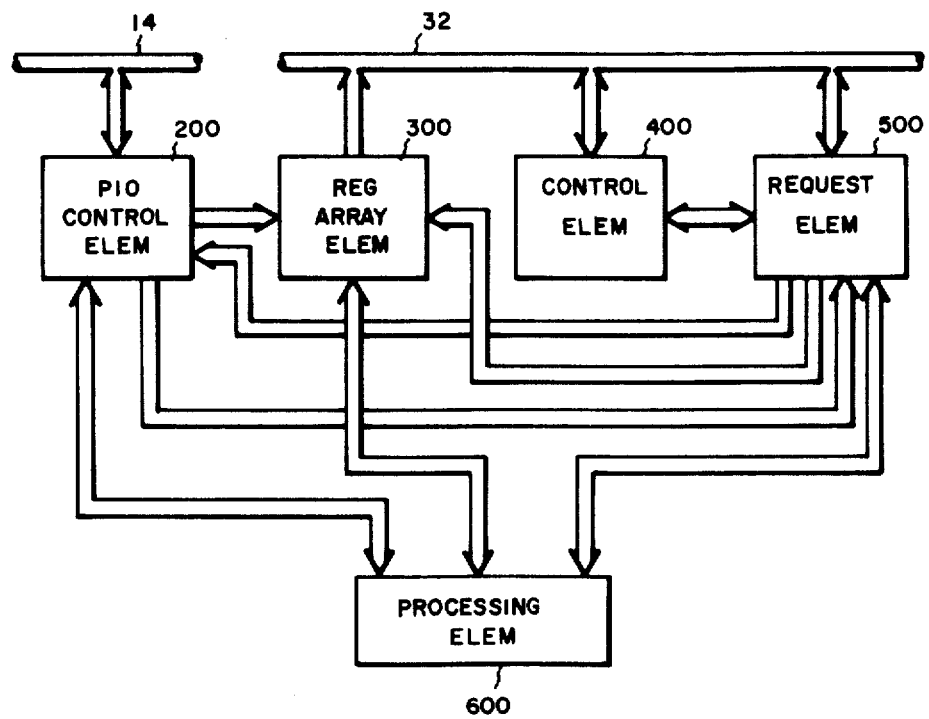
FIG. 7 is a block diagram illustrating a functional device.

FIG. 7 illustrates a general configuration of a functional device capable of performing the device-to-device data transfer under the control of SMAC 18. Each functional device comprises PIO control element 200 for communicating with processor 12 via PIO bus 14 and for decoding various commands from processor 12 to control other elements such as register array element 300 for retaining control information and data required in the device-to-device data transfer; control element 400 for generating and decoding the control codes and for setting bits 0, 1 and 7 of the control byte; request element 500 for handling various requests within the functional device; and processing element 600 (scanner, printer and so on) for performing particular data processing operations. PIO control element 200, connected to PIO bus 14, and register array element 300, control element 400 and request element 500, all of which are connected to SMA bus 32, constitute an I/O adaptor. The same I/O adaptor may be used for each functional device.

Figure 8A:
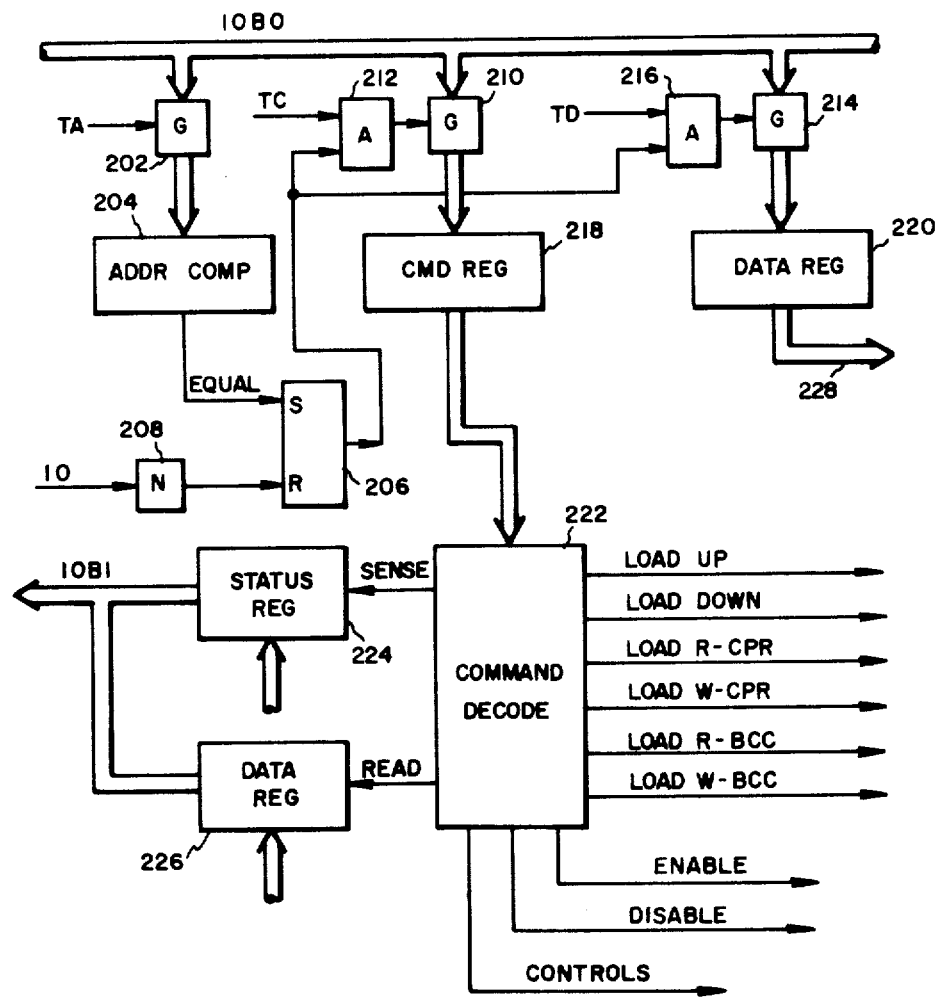
FIG. 8A is a block diagram illustrating the command processing portion of PIO control element 200 in FIG. 7.
Figure 8B:
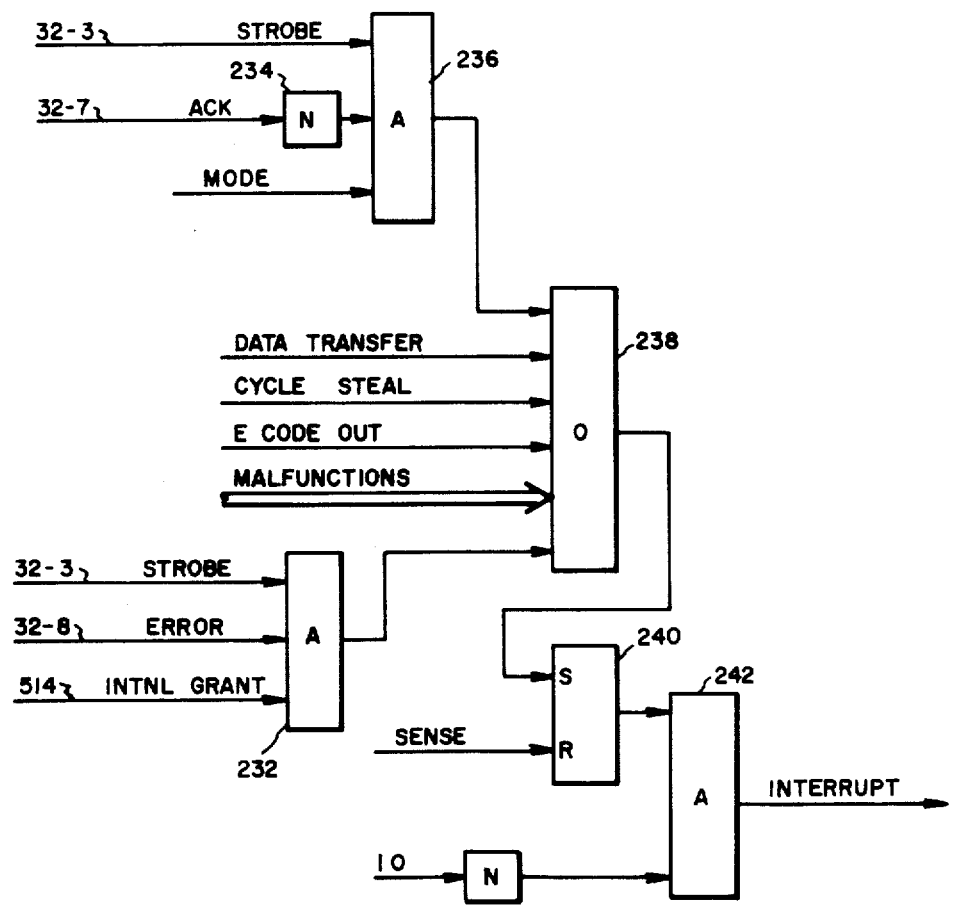
FIG. 8B is a block diagram illustrating the interruption handling portion of PIO control element 200 in FIG. 7.

PIO control element 200 consists of a command processing portion shown in FIG. 8A and an interrupt handling portion shown in FIG. 8B. The IOBO included in PIO bus 14 transfers addresses, commands or data from processor 12 to each functional device. What information is on the IOBO is indicated by a signal on the TA, TC or TD line. When the TA line is activated, the information on the IOBO is an address of a functional device, which is sent to address comparator 204 through address input gate 202. Address comparator 204 compares the address of the associated functional device with the incoming address and sends an equal signal to a set input of latch 206 if they are equal to each other. Since processor 12 is activating the IO line to indicate that it is performing an I/O operation at this time, a signal applied from inverter 208 to a reset input of latch 206 is off.

The set output of latch 206 is applied to one input of AND circuit 212 for enabling command input gate 210 and to one input of AND circuit 216 for enabling data input gate 214. The other inputs of AND circuits 212 and 216 are connected to the TC and TD lines, respectively. Then, if the TC line is activated indicating that the information on the IOBO is a command, AND circuit 212 is conditioned to enable comman input gate 210 so that the command on the IOBO is passed into command register 218. On the other hand, if the TD line is activated indicating that the information on the IOBO is a data byte, AND circuit 216 is conditioned to enable data input gate 214 so that the data byte on the IOBO is passed into input data register 220. The command loaded into command register 218 is then sent to command decoder 222.

There are six load commands, explained below, plus the Enable command and the Disable command all of which have particular utility to this invention. The Enable command initiates the operation of the functional device and the Disable comand terminates it. In addition to the above commands, other commands that may be used include: a Sense command for reading the content of status register 224 onto the IOBI; a Read command for reading the content of output data register 226 onto the IOBI; various reset commands for resetting selected circuits within the functional device; and various control commands for processing element 600. However, these commands are conventional and are not explained herein.

The six load commands for writing the content of input data register 220 into register array element 300 via bus 228 are as follows:

1. Load Up for loading an address of an upstream device into an upstream device register.
2. Load Down for loading an address of a downstream device into a downstream device register.
3. Load R-CPR for loading an identifier (table address bits 1 through 5) of a CPR used in the read operation of memory 16 into a R-CPR register.
4. Load W-CPR for loading an identifier (table address bits 1 through 5) of a CPR used in the write operation of memory 16 into a W-CPR register.
5. Load R-BCC for loading a BCC used in the read operation of memory 16 into an R-BCC register.
6. Load W-BCC for loading a BCC used in the write operation of memory 16 into a W-BCC register.

Although it is assumed that the address of SMAC 18 has been retained in a SMAC register within register array element 300, this address may also be loaded from processor 12 by using another load command. Of course, these load commands would not be required if the aforementioned various control parameters are fixed.

The interrupt handling portion shown in FIG. 8B generates an interrupt signal to processor 12 when processor 12 is to be informed of the initiation or completion of the device-to-device data transfer through memory 16, when a cycle steal is to be requested, or when an error has occurred during the data transfer. Possible errors are a parity error on data bus 32-6, non-receipt of the ACK signal in the control mode, and malfunctions of processing element 600.

The occurrence of the parity error is detected by AND circuit 232 and the non-receipt of the ACK signal is detected by inverter 234 and AND circuit 236. The ACK signal on line 32-7 and the error signal on line 32-8 are sampled synchronously with the strobe pulse on line 32-3. AND circuit 232 also receives an internal grant signal generated by request element 500 in addition to the strobe pulse and the error signal from SMAC 18. When these input conditions are satisfied, the output of AND circuit 232 becomes active to set interrupt request latch 240 through OR circuit 238.

AND circuit 236 receives the strobe pulse, the inverted ACK signal, and the mode signal which is supplied from request element 500. Therefore, an output of AND circuit 236 becomes active when the ACK signal is not received from the other functional device or SMAC 18 in the control mode, thus setting interrupt request latch 240 through OR circuit 238. OR circuit 238 further receives a data transfer request, a cycle steal request, an E code out request and one or more malfunction signals from processing element 600, each of which sets interrupt request latch 240.

As already explained with reference to FIG. 4, processor 12 can be interrupted only when the IO line included in PIO bus 14 is not active. Therefore, the set output of interrupt request latch 240 is passed onto PIO bus 14 through AND circuit 242 which receives as another input an inverted IO signal. A line for sending the interrupt request to processor 12 may be a selected line (for example, bit 2) in the IOBI. Since processor 12 must determine a type of interruption when the interrupt request is accepted, all the inputs to OR circuit 238 are loaded into corresponding bit positions of status register 224. Processor 12 carries out an interrupt handling operation by reading the content of status register 224 using the Sense command. Interrupt request latch 240 may be reset by the Sense command.

Figure 9:
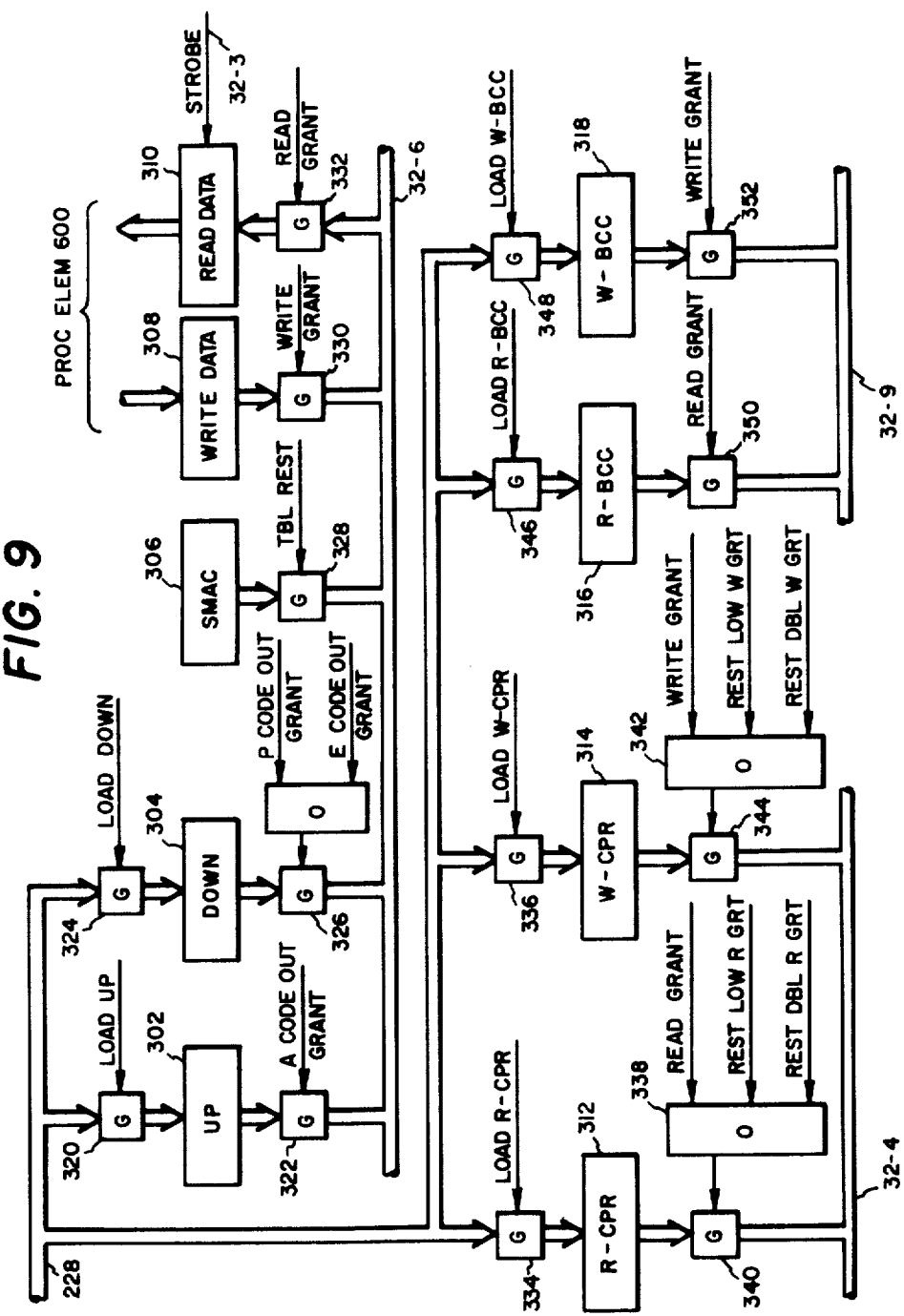
FIG. 9 is a block diagram illustrating the register array element 300 in FIG. 7.

FIG. 9 illustrates in detail register array element 300 into which the content of input data register 220 is loaded under the control of command decoder 222. Register array element 300 includes nine registers. Upstream device register 302, downstream device register 304, SMAC register 306, write data register 308 and read data register 310 are connected to data bus 32-6 of SMA bus 32. R-CPR register 312 and W-CPR register 314 are connected to control byte bus 32-4 (bits 2 through 6). R-BCC register 316 and W-BCC register 318 are connected to BCC bus 32-9.

Upstream device register 302 is loaded with an upstream device address from input data register 220 through gate 320 when the Load Up command is decoded by command decoder 222. Since each device address comprises five bits in this embodiment, a five bit width is sufficient for upstream device register 302 as well as downstream device register 304 and SMAC register 306. The content of upstream device register 302 is output to bit positions 0 through 4 of data bus 32-6 when gate 322 is enabled by an A code out grant signal from request element 500. Downstream device register 304 is loaded with a downstream device address from input data register 200 through gate 324 when the Load Down command is decoded. This address is sent out to bit positions 0 through 4 of data bus 32-6 when gate 326 is enabled by a P code out or E code out grant signal from request element 500.

SMAC register 306 has already been loaded with the address of SMAC 18, which is output to bit positions 0 through 4 of data bus 32-6 through gate 328 when a control code (see Table III) is sent to SMAC 18, that is when the table restore operation should be performed. If the address of SMAC 18 is '00000' as shown in Table II, SMAC register 306 and gate 328 might not be used. A table restore signal applied to gate 328 is a logical OR of four restore grant signals to OR circuits 338 and 342 explained later. When the content of upstream device register 302, downstream device register 304 or SMAC register 306 is sent out to data bus 32-6, a selected control code from control element 400 is simultaneously sent out to bit positions 5 through 7 of data bus 32-6.

Write data register 308 temporarily stores a data byte to be written into memory 16 from processing element 600, and outputs the data byte to data bus 32-6 when gate 330 is enabled by a write grant signal from request element 500. On the other hand, read data register 310 is used when a data byte read out of memory 16 is transferred to processing element 600. Input gate 332 of read data register 310 is enabled by a read grant signal from request element 500, but the data byte on data bus 32-6 is latched into read data register 310 when SMAC 18 generates the strobe pulse.

R-CPR register 312 is loaded with an identifier of a CPR for memory reading (five lower bits of a table address) through gate 334 when the Load R-CPR command is decoded. W-CPR register 314 is loaded with an identifier of a CPR for memory writing through gate 336 when the Load W-CPR command is decoded. Since each CPR identifier sent from processor 12 during the initialization comprises five lower bits of the table address of pointer table 20, each of registers 312 and 314 may also have a five bit width. The content of R-CPR register 312 is sent out to bit positions 2 through 6 of control byte bus 32-4 when gate 340 is enabled by OR circuit 338. The content of W-CPR register 314 is output to bit positions 2 through 6 of control byte bus 32-4 when gate 344 is enabled by OR circuit 342. Simultaneously, three bits from control element 400 are output to bit positions 0, 1 and 7 of control byte bus 32-4.

OR circuit 338 enables gate 340 when a read grant signal, which grants a read request, a restore low R grant signal, which grants a request for restoring a low byte of a primary CPR for memory reading, or a restore double R grant signal, which grants a request for restoring double bytes of said primary CPR, is received from request element 500. OR circuit 342 enables gate 344 when a similar grant signal related to the write operation is received from request element 500. R-BCC register 316 and W-BCC register 318 are loaded with three-bit BCC's for memory reading and for memory writing through gates 346 and 348 when corresponding load commands are decoded, respectively. The content of register 316 or 318 is output to BCC bus 32-9 through an associated gate 350 or 352 which is enabled by the read grant signal or the write grant signal.

Although each of the device address and the CPR identifier comprises five bits and the BCC comprises three bits, all of which are less than the number of bits in the IOBO, it is arbitrary what IOBO bits are assigned to such information.

Figure 10A:
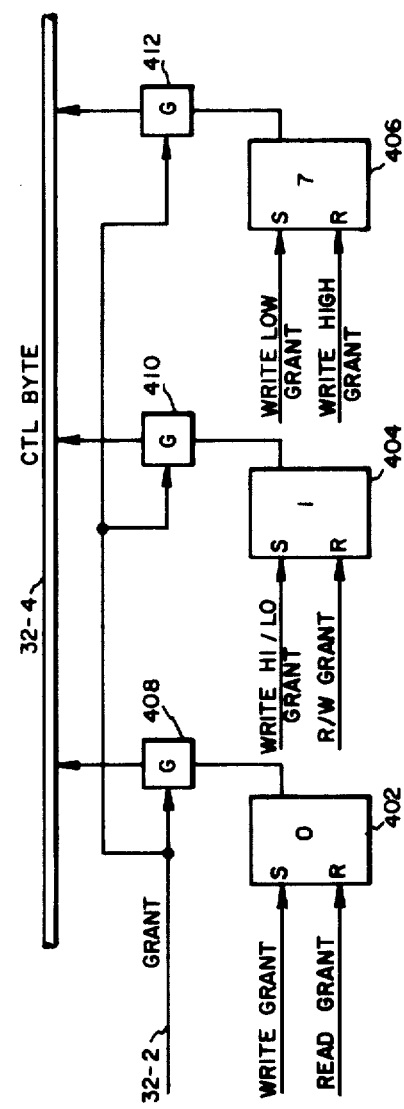
FIG. 10A is a block diagram illustrating the control byte generating portion of control element 400 in FIG. 7.
Figure 10B:
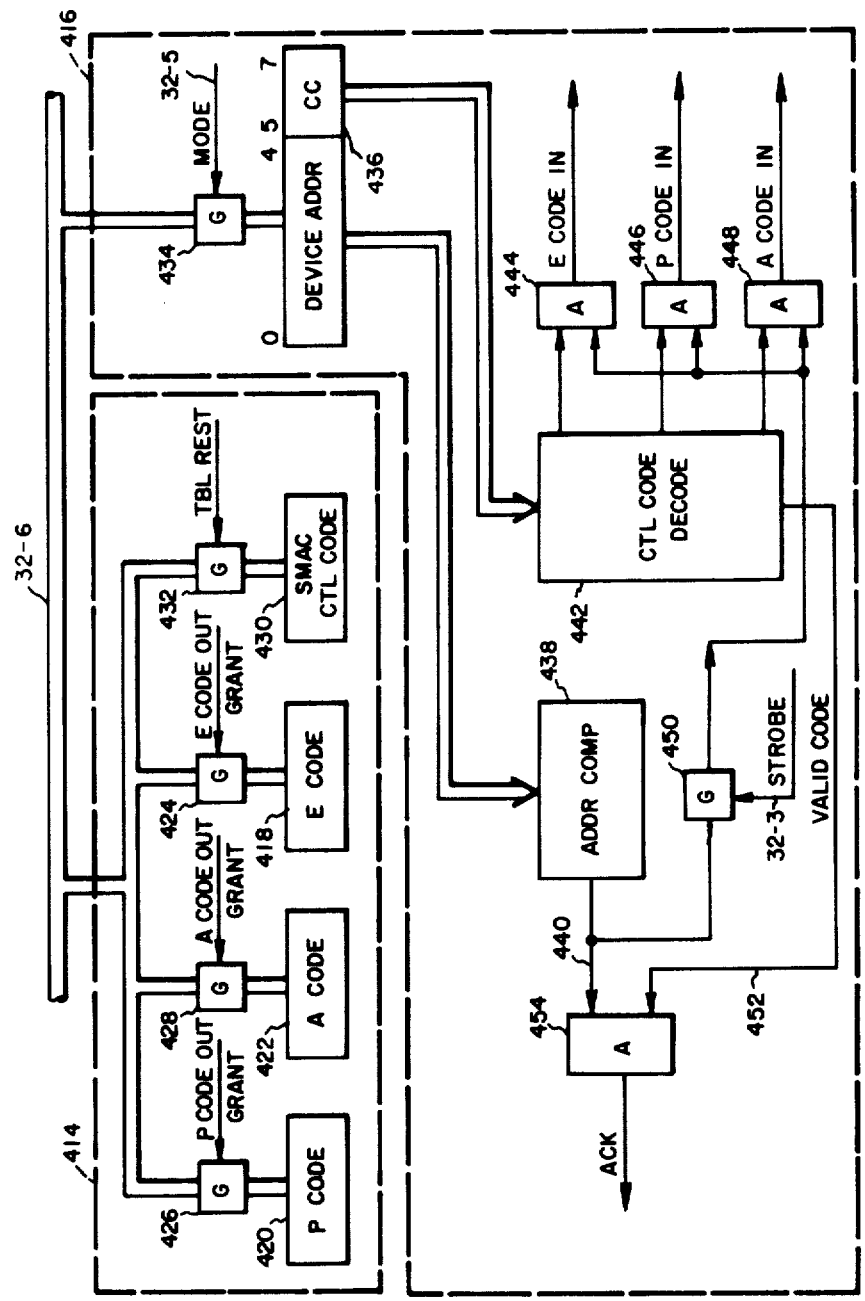
FIG. 10B is a block diagram illustrating the control code processing portion of control element 400 in FIG. 7.

Control element 400 consists of a control byte generating portion, shown in FIG. 10A, for generating a specific combination of bits 0, 1 and 7 of a control byte, and a control code processing portion, shown in FIG. 10B, for generating and decoding a control code. The control byte generating portion in FIG. 10A includes three latches 402, 404 and 406 which respectively determine bits 0, 1 and 7 of a control byte. Bit 0 latch 402 is set by the write grant signal from request element 500 and reset by the read grant signal. Bit 1 latch 404 is set by a write high grant signal for granting a write CPR high byte request or a write low grant signal for granting a write CPR low byte request, and reset by the read grant signal or the write grant signal when the memory is to be accessed. Bit 7 latch 406 is set by the write low grant signal and reset by the write high grant signal. The contents of these latches 402, 404 and 406 are sent out to bit positions 0, 1 and 7 of control byte bus 32-4 through gates 408, 410 and 412, respectively, which gates are simultaneously enabled by the grant signal from SMAC 18. Instead of using these three latches, the signals applied to the respective set inputs (S's) may be directly sent out through their associated gates.

The control code processing portion shown in FIG. 10B consists of control code generating portion 414 and control code decoding portion 416. Control code generating portion 414 includes E code register 418, P code register 420 and A code register 422 wherein the E code (End of Process), the P code (Post) and the A code (Available) shown in Table IV are retained, respectively. One of these control codes is output to bit positions 5 through 7 of data bus 32-6 through gate 424, 426 or 428 when a corresponding output grant signal is generated by request element 500. In case of the E or P code, the content of downstream device register 304 is simultaneously sent out to bit positions 0 through 4 of data bus 32-6 while in case of the A code, the content of upstream device register 302 is output to bit positions 0 through 4 of data bus 32-6.

In addition to the above three control codes each of which is sent to a functional device, control code generating portion 414 further includes SMAC control code generator 430 for generating a control code (see Table III) to be sent to SMAC 18. SMAC control code generator 430 outputs a control code specifying a low byte restore operation or a double byte restore operation to bit positions 5 through 7 of data bus 32-6 when pointer table 20 is to be restored. Its output gate 432 is enabled by the same signal as that applied to output gate 328 of SMAC register 306.

SMAC control code generator 430 is preferably constructed in the same manner as the control byte generating portion shown in FIG. 10A. In accordance with Table III above, the restore double R grant signal to OR circuit 338 (FIG. 9) or the restore double W grant signal to OR circuit 342 is output as bit 6. The restore low R grant signal to OR circuit 338 or the restore low W grant signal to OR circuit 342 is output as bit 7.

Although not shown in the drawings, a parity generator is connected between data bus 32-6 and various gates which pass the data, device addresses and control codes to data bus 32-6.

Control code decoding portion 416 receives a device address (bits 0 through 4) and a control code (bits 5 through 7) on data bus 32-6 into register 436 through gate 434 which is enabled when the mode signal on line 32-5 is active. The device address loaded into bit positions 0 through 4 of register 436 is sent to address comparator 438 and compared therein with its own functional device address. If they are equal to each other, an equal signal is generated on line 440.

The control code (CC) loaded into bit positions 5 through 7 of register 436 is decoded by control code decoder 442. Control code decoder 442 partially conditions AND circuit 444 when the E code is decoded, AND circuit 446 when the P code is decoded, or AND circuit 448 when the A code is decoded. AND circuits 444, 446 and 448 also receive the equal signal from address comparator 438 through gate 450 which is enabled by the strobe pulse on line 32-3. Accordingly, when the device address loaded into register 436 is equal to its own address and one of the E, P and A codes is decoded, a corresponding one of AND circuits 444, 446 and 448 is conditioned to send a corresponding code input signal to request element 500. When the control code decoded by control code decoder 442 is valid, i.e., the control code has been found to be one of the above three codes, control code decoder 442 further generates a valid code signal on line 452. AND circuit 454 is conditioned by the equal signal on line 440 and the valid code signal on line 452 to thereby generate an output signal which is supplied as the ACK signal to ACK line 32-7 of SMA bus 32. The functional device which had sent the device address and the control code can proceed to the next operation only when the ACK signal is received. The function of AND circuit 454 is the same as that of AND circuit 116 (FIG. 6B) of SMAC 18.

Figure 11:
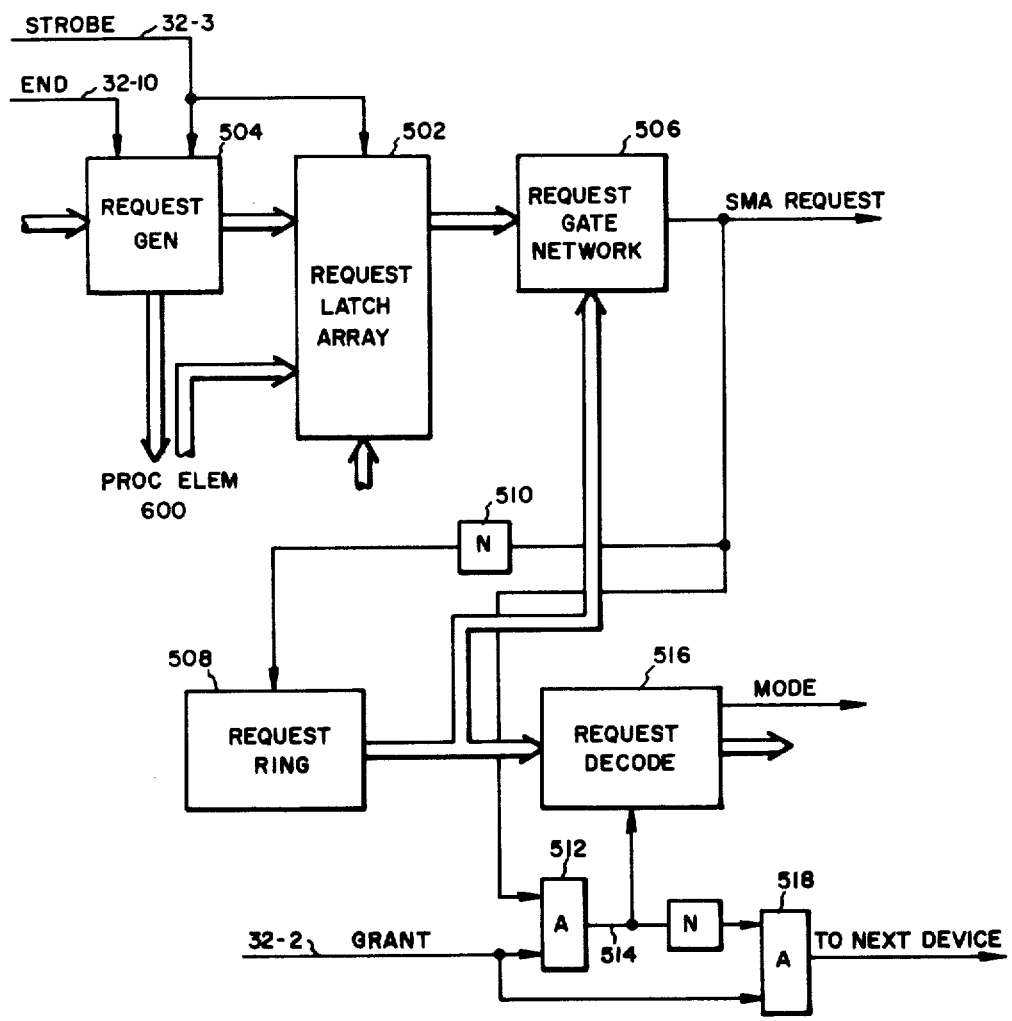
FIG. 11 is a block diagram schematically illustrating request element 500 in FIG. 7.

FIG. 11 schematically illustrates request element 500. Request element 500 includes request latch array 502 for temporarily retaining various SMA requests generated within the functional device. Request latch array 502 consists of a plurality of request latches corresponding to the following SMA requests, respectively.

1. Memory Read
2. Memory Write
3. P Code Out
4. A Code Out
5. Restore Low R (Read) of Primary CPR
6. Restore Double R of Primary CPR
7. Restore Low W (Write) of Primary CPR
8. Restore Double W of Primary CPR
9. E Code Out
10. Write CPR Low Byte ⎫
11. Write CPR High Byte ⎬ Cycle steal Among these requests, requests 1, 2, 9, 10 and 11 are generated by processing element 600 while requests 3 through 8 are generated by request generating circuit 504. A request selecting circuit consisting of request gate network 506, request ring 508 and inverter 510 selects a single output from request latch array 502. A single output from request gate network 506 is connected to request line 32-1 of SMA bus 32 through a driver circuit (not shown) and also to a shift terminal of request ring 508 through inverter 510. Request ring 508 is a recirculating shift register having the same number of bit positions as that of the latches of request latch array 502, wherein a single binary one is recirculated. Request gate network 506 outputs the content of a request latch associated with the bit position having the binary one in request ring 508. When the selected request latch is off, the binary one in request ring 508 is shifted to the next bit position by a shift signal from inverter 510 so that the content of the next request latch corresponding to that bit position is output from request gate network 506. When the corresponding request latch has been set, the output of request gate network 506 becomes active and the SMA request signal is sent to SMAC 18. During the time interval for sending out the request signal, the shift operation of request ring 508 is inhibited.

The output of request gate network 506 is also connected to a first input of AND circuit 512. A second input of AND circuit 512 is connected to grant line 32-2 of SMA bus 32. Accordingly, if the grant signal is received from SMAC 18 while the SMA request exists, AND circuit 512 is conditioned to generate an internal grant signal on line 514. This signal is applied as an enable signal to request decoder 516 which identifies a granted request by examining which bit position in request ring 508 has the binary one.

Request decoder 516 has the same number of request grant lines as that of the request latches. Only one of the request grant lines, which corresponds to the bit position having the binary one in request ring 508, is activated when the internal grant singal is generated. When the request decoder 516 generates a grant signal corresponding to one of the aforementioned requests 3 (P code out) through 9 (E code out), it also generates a mode signal simultaneously. The eleven request grant lines of request decoder 516 are respectively connected to the corresponding gates of register element 300 (FIG. 9) and control element 400 (FIGS. 10A and 10B) so as to pass necessary information associated with the granted request to SMA bus 32. The output signal of request decoder 516 is also used for resetting a corresponding request latch and for allowing request generating circuit 504 to generate a request.

The internal grant signal generated on line 514 from AND circuit 512 is applied to a first input of AND circuit 518 after being inverted. A second input of AND circuit 518 receives the grant signal from SMAC 18. AND circuit 518 passes the grant signal from SMAC 18 to the next functional device if no SMA request is generated, but prevents the grant signal from being passed if any SMA request is generated. The internal grant signal on line 514 is also provided to AND circuit 232 shown in FIG. 8B.

Request generating circuit 504 generates one of the aforementioned requests 3 through 8 in response to the output of request decoder 516, the enable or disable signal from command decoder 222 (FIG. 8A), and three code inputs from control code decoder 442 (FIG. 10B), as well as the strobe pulse and the end signal from SMAC 18. Request generating circuit 504 also generates a read ready signal indicating that a read operation of memory 16 is possible, a write ready signal indicating that a write operation of memory 16 is possible, or an end of process signal indicating that a process has been completed. Each of these signals is sent to processing element 600.

Figure 12B:
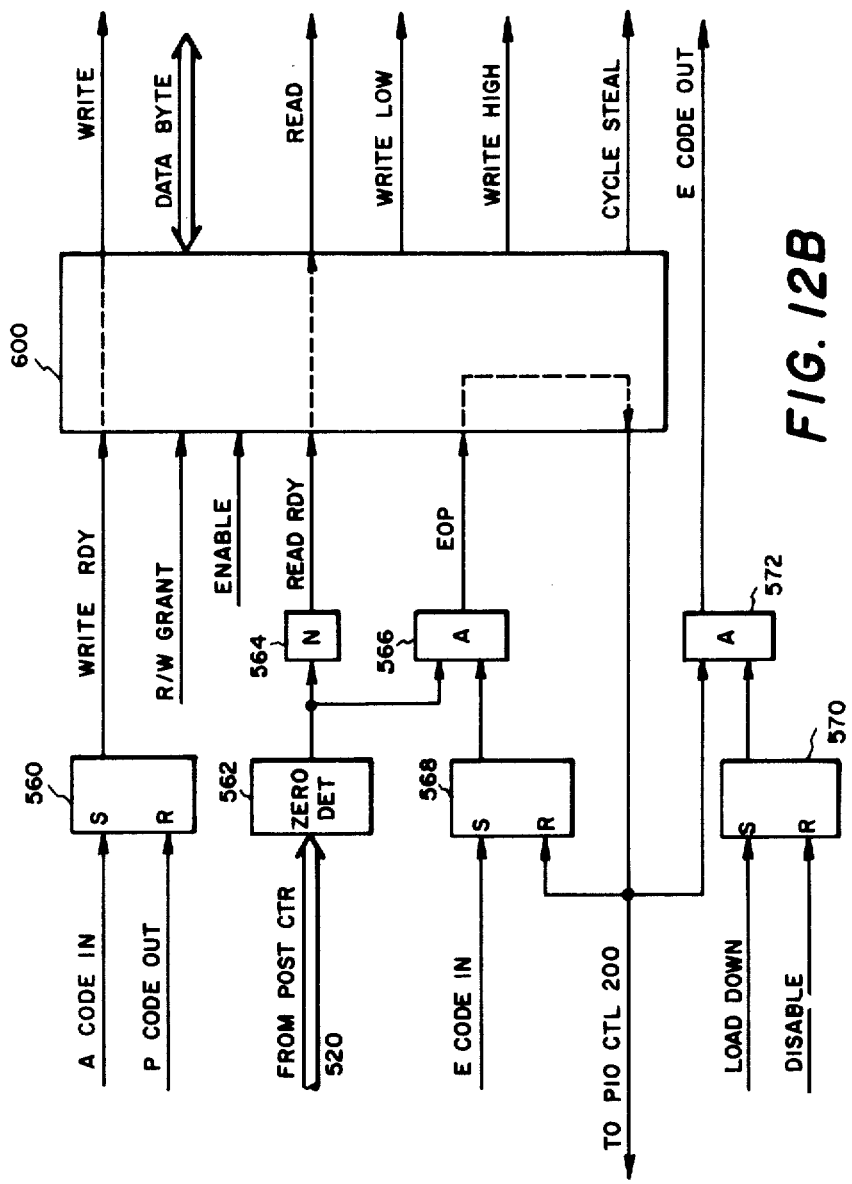

Request generating circuit 504 is illustrated in detail in FIGS. 12A and 12B. The circuit of FIG. 12A generates the aforementioned requests 3 through 8 while the circuit of FIG. 12B generates the read ready signal, the write ready signal or the end of process signal sent to processing element 600.

More particularly, the circuit of FIG. 12A generates the A code out request from OR circuit 528, the restore low R request from AND circuit 546, the restore double R request from N detector 544, the restore double W request from N detector 554, the restore low W request from AND circuit 556, and the P code out request from AND circuit 550. The A code out requst from OR circuit 528 indicates that a specified buffer area includes one or more buffer segments available for writing from the upstream device. To this end, post counter 520 is provided which is incremented by one every time the P code is recieved from the upstream device and is decremented by one every time the present functional device completes the reading of one buffer segment. An increment terminal of post counter 520 receives the P Code In from AND circuit 446 shown in FIG. 10B, and a decrement terminal receives a read end signal from AND circuit 538. Since AND circuit 538 is conditioned when the end signal and the strobe pulse from SMAC 18 are received at AND circuit 540 while request decoder 516 is generating the read grant signal, the output of AND circuit 538 indicates that the reading of one buffer segment has been completed.

The content of post counter 520 is provided to N detector 522 to determine whether N representing the number of the buffer segments forming a buffer area has been reached. In this description, it is assumed that the number N of the buffer segments is fixed to a certain value, e.g. four. The output of N detector 522 is provided to AND circuit 526 through inverter 524. AND circuit 526 also receives the P Code In. The output of N detector 522 becomes active only when the value of post counter 520 has reached N, that is when all the buffer segments have been filled with data from the upstream device. Accordingly, AND circuit 526 is conditioned to cause the A code out request to be generated from OR circuit 528 unless an incremented value of post counter 520 is N when the P code indicating the end of writing of one buffer segment is received from the upstream device.

When the output of N detector 522 becomes active, AND circuit 526 is not conditioned so that the A code out request is not generated. This inhibits the write operation by the upstream device. The active output of N detector 522 sets latch 530. The set output of latch 530 is connected to a first input of AND circuit 532 having a second input connected to the output of AND circuit 538. AND circuit 532 is conditioned to cause the A code out request to be generated from OR circuit 528 when AND circuit 538 is conditioned after the value of post counter 520 has reached N, that is when the value of post counter 520 is changed from N to N-1. The A code out request sets a corresponding request latch in request latch array 502 and, thereafter, latch 530 is reset by the set output of the corresponding request latch.

The write operation by the upstream device is also possible when the Enable command is received from processor 12 at the end of initialization. At this time, the A code out request is generated by AND circuit 534. AND circuit 534 is conditioned if the upstream device is actually present and the enable signal is received from command decoder 222. The presence of upstream device is indicated by a signal provided from latch 536 to AND circuit 534. Latch 536 is set by the load up signal from command decoder 222. Since this signal loads the address of the upstream device into upstream device register 302 as already explained with reference to FIG. 9, this means that the upstream device associated with the illustrated functional device is present. Latch 536 is reset when the Disable command is issued by processor 12 at the end of data transfer between the functional devices or at the time of an error.

The read end signal from AND circuit 538 is also used as an increment siganl for segment counter 542. Segment counter 542 is a modulo N counter which is incremented by one every time the reading of each buffer segment is completed. Therefore, its content represents the number of a buffer segment in which all the data has been read out. N detector 544 detects whether the value of segment counter 542 has reached N, that is whether the reading of the last buffer segment has been completed. If not, the restore low R request is generated from AND circuit 546 after each buffer segment but the last is read out.

AND circuit 546 is conditioned by the read end signal from AND signal 538, an active output of inverter 548 generated when the output of N detector 544 is off, and a '1' signal. It should be recalled that the restore low R request is generated when a low byte of a secondary CPR is to be written into a low byte position of a primary CPR paired therewith. However, if all locations of each buffer segment are used, this request is unnecessary and, thus, '0' is applied to the third input of AND circuit 546. The application of '1' or '0' to the third input of AND circuit 546 may be realized by fixed wiring or a jumper. AND circuit 556 generating the restore low W request during the memory write also has such an input. The output of N detector 544 becomes active when the reading of the last buffer segment is completed and hence the value of segment counter 542 reaches N. The active output is used as the restore double R request to request writing of double bytes from a secondary CPR into a paired primary CPR for reading the memory.

When a buffer segment boundary is reached during a write operation with memory 16, the restore low W request or the restore double W request is generated by means of AND circuit 550, segment counter 552, N detector 554, AND circuit 556 and inverter 558, all of which form the same circuitry as that for the read operation just described. AND circuit 550 is conditioned when each buffer segment boundary is reached while request decoder 516 is generating the write grant signal. Thus, the output of AND circuit 550 indicates that a buffer segment has been filled with data and is ready to be read out by the downstream device. Hence the output of AND 550 is used as the P code out request.

The circuit shown in FIG. 12B generates the write read signal, the read ready signal or the end of process (EOP) signal, each being sent to processing element 600. Processing element 600 of the functional device can write its data into memory 16 only after the A code is received from the downstream device. Therefore, an output of latch 560, which is set by the A Code In from AND circuit 448 in FIG. 10B, is supplied as the write ready signal to processing element 600. When processing element 600 is ready for writing after receiving the write ready signal, it sends a write request to request latch array 502 and a data byte to write data register 308. If latch 560 remains set when the write request is granted by request decoder 516, processing element 600 outputs the next write request and data byte. The first write request and data byte may be generated in response to the write ready signal and the enable signal from command decoder 222.

Processing element 600 can read memory 16 whenever the value of post counter 520 is not zero. This status is detected by zero detector 562. An output of zero detector 562 becomes active only when the value of post counter 520 is zero. Therefore, inverter 564 which inverts the output of zero detector 562 sends the read ready signal whenever the value of post counter 520 is equal to or greater than one. Processing element 600, if ready for reading, generates the read request in response to the read ready signal. The data read out of memory 16 by processing element 600 are those written by the upstream device. Therefore, inverter 564 never generates the read ready signal if the upstream device is not present since, in that case, no P code is received and thus post counter 520 remains at the zero state established during the power on reset. Processing element 600 obtains the next data byte from read data register 310 in response to the read grant signal from request decoder 516.

The EOP signal is generated from AND circuit 566 which is conditioned when the E code is received from the upstream device and the value of post counter 520 becomes zero indicating no data to be read. The receipt of the E code from the upstream device is indicated by latch 568 which is set by the E Code In from AND circuit 444 shown in FIG. 10B.

Processing element 600, after receiving the EOP signal, generates the E code out request upon completion of its own processing operations. It is noted that latch 568 will never be set and thus the EOP signal will never be generated if the upstream device is not present. However, in that case, processing element 600 would generate the E code out request upon completion of all write operations into memory 16 or all output operations to an external device. The E code out request is sent to request latch array 502 through AND circuit 572 only when the downstream device is indicated by latch 570 which is similar to latch 536 shown in FIG. 12A. Latch 570 is set by the load down signal indicating the presence of downstream device, and reset by the disable signal.

The E code out request generated from processing element 600 indicates that all the processing operations within the functional device have been completed. Since such status must be signaled to processor 12, the E code out request is also sent to a corresponding bit position in status register 224 in PIO control element 200 and to OR circuit 238 to thereby set interrupt request latch 240. If the IO line of PIO bus 14 is inactive at that time, AND circuit 242 is conditioned to send the interrupt request to processor 12. Processor 12 examines the content of status register 224 by issuing the Sense command, thus finding the end of process status of the functional device which has interrupted processor 12.

In addition to the aforementioned write, read and E code out requests, processing element 600 would also generate cycle steal, write low byte and write high byte requests on cycle stealing. Processor 12 would be interrupted by the cycle steal request and SMAC 18 would receive the write low/high byte requests.

The request latch array 502, request gate network 506 and request decoder 516 shown in FIG. 11 together form a plurality of identical circuits for each of the SMA requests. As a typical example, their circuit configuration for the read request is illustrated in FIG. 13.

Figure 13:
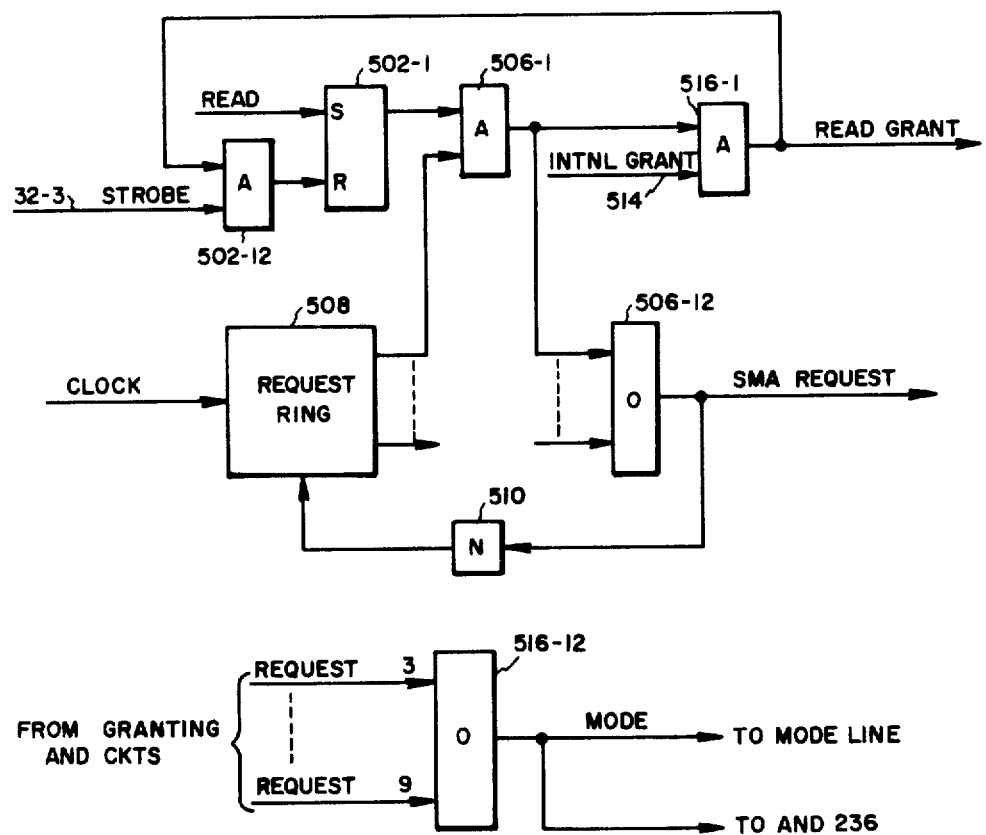
FIG. 13 is a block diagram illustrating in detail portions of request latch array 502, request gate network 506 and request decode 516 in FIG. 11.

The circuit configuration in FIG. 13 includes read request latch 502-1, which latches the read request from processing element 600, selecting AND circut 506-1, which passes the set output of read request latch 502-1 when the binary one is shifted into the corresponding (first) bit position of request ring 508, and granting AND circuit 516-1, which generates a read grant signal in response to the internal grant signal from AND circuit 512 (FIG. 11) when the output of selecting AND circuit 506-1 is on. Although not shown in FIG. 13, similar request latches (502-2 through 502-11), selecting AND circuits (506-2 through 506-11), and granting AND circuits (516-2 through 516-11) are also provided for other SMA requests. Request ring 508 contains a single binary one recirculated within it so that only a single selecting AND circuit is conditioned at a time. If a corresponding request latch has been set at that time, the output of the selecting AND circuit becomes active and the granting AND circuit generates a request grant signal in response to the internal grant signal on line 514.

The output of eleven selecting AND circuits 506-1 (through 506-11) are also provided to OR circuit 506-12. OR circuit 506-12 generates an SMA request signal whenever any selecting AND circuit is conditioned. The SMA request signal is output to request line 32-1 of SMA bus 32 through a driver circuit (not shown) and further provided to the shift terminal of request ring 508 through inverter 510. The binary 1 is shifted to the next bit position in response to a clock pulse from a clock circuit (not shown) only when the output of inverter 510 is active, that is when the SMA request signal is not generated, thus partially conditioning the next selecting AND circuit. So long as the SMA request signal is generated, request ring 508 is prevented from being shifted. The SMA request signal remains on until the corresponding request latch is reset. With regard to the read request, the read grant signal from granting AND circuit 516-1 is applied to a first input of AND circuit 502-12. A second input of AND circuit 502-12 receives the strobe pulse from SMAC 18. Therefore, if the strobe pulse is actually received while the read grant signal is generated, AND circuit 502-12 is conditioned to cause its active output to reset read request latch 502-1. Similar AND circuits (502-13 through 502-22) are connected to the reset inputs of other request latches (502-2 through 502-11), respectively. The read grant siganl from granting AND circuti 516-1 is applied to gate 332, OR circuit 338 and gate 350 in FIG. 9, to the reset inputs of bit 0 latch 402 and bit 1 latch 404 in FIG. 10A. and to AND circuit 538 in FIG. 12A.

As already explained before, each functional device is operated either in the data mode or in the control mode. Among the aforementioned eleven SMA requests 1 through 11, request 3 (P code out) through request 9 (E code out) are handled in the control mode. Therefore, if any of these requests are granted, the mode signal must be on. To this end, OR circuit 516-12 which receives outputs of a granting AND circuit (516-3) for the P code out request through a granting AND circuit (516-9) for the E code out request is provided in request decoder 516. The output of OR circuit 516-12 is connected to mode line 32-5 of SMA bus 32 through a driver circuit (not shown) and also to the second input of AND circuit 236 in FIG. 8B.

Various register, counters and latches included in the circuits shown in FIG. 8A through 13 are all reset by the POR (Power On Reset) signal from processor 12.

TRANSMIT OPERATION

The overall operations of the circuits shown in FIGS. 6A through 13 will now be described using a transmit operation of the facsimile system in FIG. 1 as an illustrative example. In the transmit operation, scanner 2, compressor 6 and communication device 10 are used.

An operator may initiate the transmit operation by turning on a power supply switch, feeding a document into a scanner 2, and then pushing a start button. When the power supply switch is turned on, processor 12 sends the POR signal to all the functional devices to reset their various registers, counters and latches. Then, with the start button pushed, scanner 2 sends a data transfer interrupt request to PIO control element 200 of I/O adaptor 2A. This causes a corresponding bit position of status reguster 224 (FIG. 8A) to be set on and further causes interrupt request latch 240 to be set through OR circuit 238 (FIG. 8B). If the IO line of PIO bus 14 is not activated at that time, the interrupt request is sent to processor 12 through AND circuit 242.

Processor 12, after accepting the interrupt request, then determines which functional device generated the request and the type of interruption by sequentially outputting the device addresses of scanner 2 through communication device 10 and the Sense command on the IOBO of PIO bus 14. When the device address of scanner 2 is recieved at PIO control element 200 of I/O adapter 2A. address comparator 204 in FIG. 8A generates the equal signal, thereby causing latch 206 to be set. At this time, with the IO line being activated, the output of inverter 208 is off, and the interrupt request output from AND circuit 242 (FIG. 8B) is inhibited. Then, with the TC line being active, the Sense command is received by command register 218. Command decoder 222 decodes the Sense command and causes the content of status register 224 to be sent out to the IOBI. Since status register 224 of I/O adapter 2A contains a bit indicating the data transfer request. processor 12 knows that scanner 2 has interrupted to request the data transfer. Then, SMAC 18 and I/O adapters 2A, 6A and 10A are initialized by processor 12. Processor 12 performs the following in the initialization.

1. Specifies a first buffer area to be used for transferring data from scanner 2 to compressor 6 and a second buffer area to be used for transferring data from compressor 6 to communication device 10.
2. Specifies CPR's for writing by scanner 2, CPR's for reading and writing by compressor 6, and CPR's for reading by communication device 10.
3. Specifies respective BCC's of the first and second buffer areas.
4. Specifies device addresses of upstream and/or downstream devices for the respective functional devices.
5. Enables the functional devices.

The above items 1 through 4 may be performed in an arbitrary sequence, but the Enable command is issued at the end of the initialization. It is assumed that the number N of the segments in each of the first and second buffer areas is fixed to four and the various parameters initialized by processor 12 are as follows:

| | |
|---|---|
| Access start address of the first buffer area | = x'1028' |
| Access start address of the second buffer area | = x'1400' |
| BCC of the first buffer area | = '100' (256 bytes) |
| BCC of the second buffer area | = '100' (256 bytes) |
| CPR's for writing by scanner 2 | = CPR 0 ('000000') CPR 32 ('100000') |
| CPR's for reading by compressor 6 | = CPR 1 ('000001') CPR 33 ('100001') |
| CPR's for writing by compressor 6 | = CPR 2 ('000010') CPR 34 ('100010') |
| CPR's for reading by communication device 10 | = CPR 3 ('000011') CPR 35 ('100011') |
| Device addresses | = (See Table II) |

Among the eight CPR's designated, CPR 0 through CPR 3 are primary CPR's, and CPR 32 through CPR 35 are secondary CPR's associated therewith, respectively.

INITIALIZATION OF SMAC 18 (FIG. 6A)

Processor 12 loads the access start address x'1028' of the first buffer area into CPR 0, CPR 1, CPR 32 and CPR 33 of pointer table 20 and loads the access start address x'1400' of the second buffer area into CPR 2, CPR 3, CPR 34 and CPR 35. Note that the access start address of the second buffer area is identical to its actual start address, while the actual start address of the first buffer area is x'1000'. This is due to the fact that a line of scanned data to be written into each of the buffer segments BS 0 through BS 3 of the first buffer area consists of 216 bytes.

Writing from processor 12 into pointer table 20 is carried out by causing both the table R/W signal on line 34A and the table access signal on line 34B to be active, and sequentially outputting the addresses of CPR 0 through CPR 3 and CPR 32 through CPR 35 on table address bus 34 together with the corresponding start addresses on table data bus 36. In response to the table R/W signal and the table access signal, table control 50 establishes a writing condition for pointer table 20 and generates gate control signals G1 through G3. Thus, pointer table 20 is written as described.

INITIALIZATION OF FUNCTIONAL DEVICES (I/O ADAPTERS)

Processor 12 initializes upstream device register 302, downstream device register 304, R-CPR register 312, W-CPR register 314, R-BCC register 316 and W-BCC register 318 (FIG. 9), and latches 530 (FIG. 12A) and 570 (FIG. 12B). In I/O adapter 2A of scanner 2, in accordance with the sequence explained with reference to FIG. 8A, processor 12 first outputs on the IOBO the address of scanner 2 (which may be the same as that shown in Table II), and then outputs on the IOBO the Load Down command followed by the address of compressor 6, the Load W-CPR command followed by the five lower bits of the table address of CPR 0 and the Load W-BCC command followed by the BCC of the first buffer area. The three load commands may be output in an arbitrary order. Thus, downstream device register 304 of I/O adpater 2A is loaded with the address '00011' of compressor 6, W-CPR register 314 is loaded with the five lower bits '00000' of table address of CPR 0, and W-BCC register 318 is loaded with the BCC '100' of the first buffer area. Also latch 570 in FIG. 12B is set by the Load Down command.

Since scanner 2 only writes the scanned data into memory 16 and no upstream device is present for scanner 2, upstream device register 302, R-CPR register 312 and R-BCC register 316 are not loaded. Therefore, registers 302, 312 and 316 and read data register 310 may not be provided in register array element 300 of I/O adapter 2A.

Similarly, in I/O adapter 6A of compressor 6, upstream device register 302 is loaded with the address '00001' of scanner 2, downstream device register 304 is loaded with the address '00101' of communication device 10, R-CPR register 312 is loaded with the five lower bits '00001' of the table address of CPR 1, W-CPR register 314 is loaded with the five lower bits '00010' of the table address of CPR 2, R-BCC register 316 is loaded with the BCC '100' of the first buffer area, and W-BCC register 318 is loaded with the BCC '100' of the second buffer area. Both of latches 530 and 570 are set.

Communication device 10 only reads the data compressed by compressor 6 out of the second buffer area. Therefore, in I/O adapter 10A, upstream device register 302 is loaded with the address '00011' of compressor 6, R-CPR register 312 is loaded with the five lower bits '00011' of the table address of CPR 3, and R-BCC register 316 is loaded with the BCC '100' of the second buffer area. In this case, only latch 530 is set. Communication device 10 does not have a downstream device in the transmit operation, but decompressor 8 will serve as the downstream devices for communication device 10 in a receive operation. Therefore, register array elemetn 300 of I/O adapter 10A should contain all the registers shown in FIG. 9 as well as I/O adapter 6A.

Processor 12 completes the intialization by finally sending the Enable command to each of I/O adapters 2A, 6A and 10A. Thereafter, except when an error has occurred, data transfer between scanner 2, compressor 6 and communication device 10 through the respective I/O adapters and memory 16 occurs without the intervention of processor 12.

Device-to-Device Data Transfer

Since in I/O adapter 6A, latch 536 shown in FIG. 12A has been set by the load up signal from command decoder 222, AND circuit 534 is conditioned when the Enable command is received at the end of the intialization. In response thereto, OR circuit 528 generates the A code out request so that a corresponding A code out request latch (502-4) in request latch array 502 is set. Also the A code out request is generated in I/O adapter 10A upon receipt of the Enable command since compressor 6 serves as an upstream device for communication device 10. At this time an SMA request is not generated yet in I/O adapter 2A.

As already explained with reference to FIG. 13, the content of the A code out request latch (502-4) is output through a selecting AND circuit (506-4) only when the binary one is shifted into a corresponding (fourth) bit position of request ring 508. For convenience sake, it is assumed that the binary one within request ring 508 exists, at first, in the first bit position corresponding to the read request. In I/O adpaters 6A and 10A, no SMA request other than the A code out is generated and OR circuit 506-12, therefore, generates no SMA request for read request latch 502-1 through the P code out request latch (502-3) to thereby cause the binary one within request ring 508 to be continuously shifted from the first bit position up to the fourth bit position. A similar shifting is also performed in I/O adapter 2A. In I/O adapters 6A and 10A, the A code out request latch (502-4) is set when the binary one is shifted to the fourth bit position. Therefore, the selecting AND circuit (506-4) is set when the binary one is shifted to the fourth bit position. Therefore, the selecting AND circuit (506-4) is conditioned and the SMA request signal is generated from OR circuit 506-12. The signal is output to request line 32-1 of SMA bus 32 and simultaneously inverted by inverter 510 to prevent request ring 508 from being shifted. In this case, I/O adapters 6A and 10A generate the SMA requests simultaneously. In I/O adapter 2A wherein no SMA request is generated, request ring 508 continues shifting.

Figure 6B:
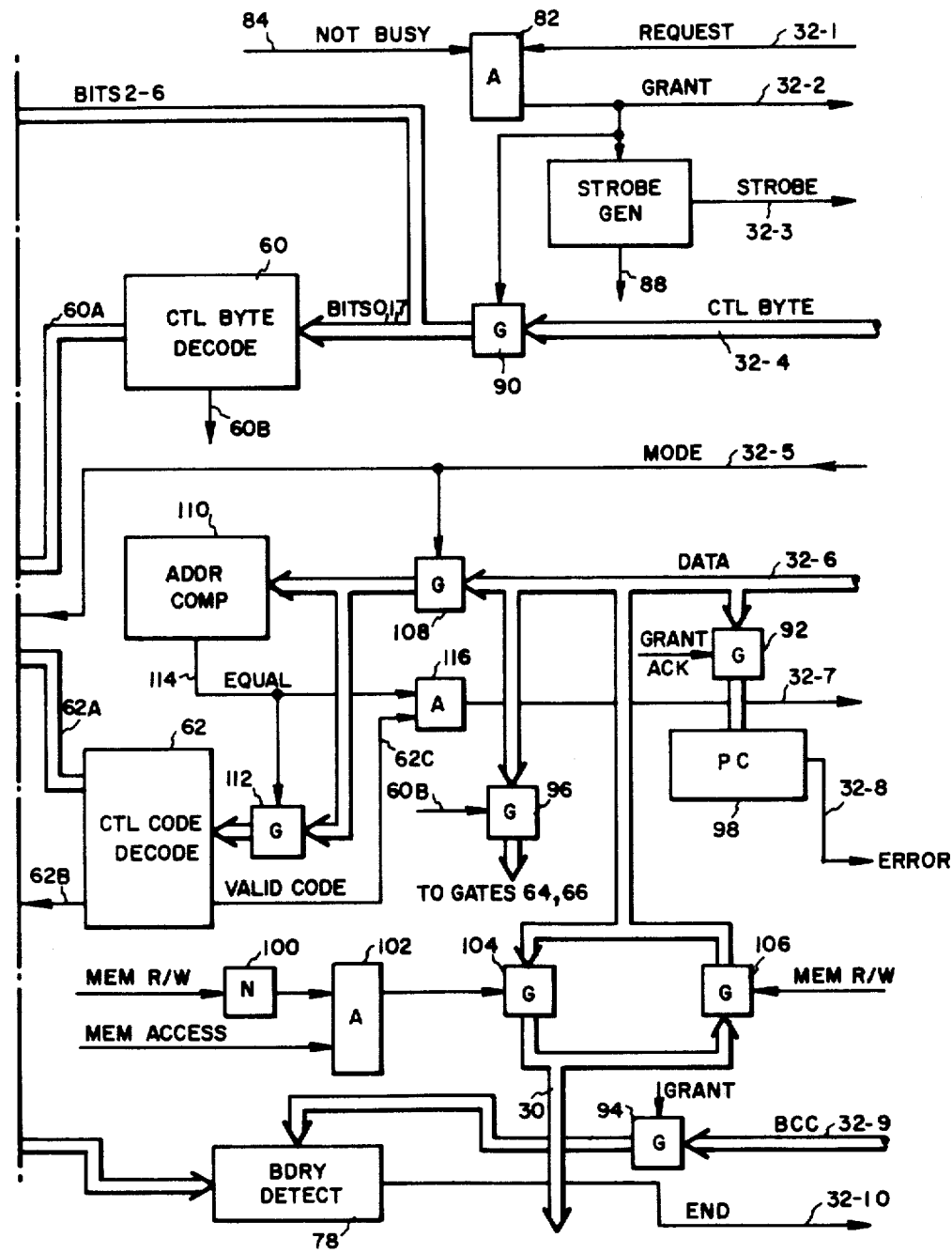

If memory 16 is not busy when request line 32-1 becomes active, SMAC 18 generates the grant signal on line 32-2 (through AND circuit 82 in FIG. 6B). In the system shown in FIG. 1, I/O adapter 6A first receives the grant signal. The grant signal is applied to the second input of AND circuit 512 shown in FIG. 11. Since at that time, the SMA request signal is applied to the first input of AND circuit 512, AND circuit 512 is conditioned by these two input signals to generate the internal grant signal. As a result, AND circuit 518 is blocked so that the grant signal from SMAC 18 is dropped at I/O adapter 6A and therefore not transmitted to I/O adpater 10A.

Referring again to FIG. 13, in I/O adapter 6A, the selecting AND circuit (506-4) for the A code out request remains conditioned, and if the internal grant signal is generated on line 514, the granting AND circuit (516-4) is conditioned to generate the A code out grant signal. Since the A code out request (request 4) is handled in the control mode, the A code out grant signal is provided to OR circuit 516-12 to thereby generate the mode signal. The A code out grant signal is also provided to gate 322 in FIG. 9 and gate 428 in FIG. 10B to enable them. Gate 322 passes the content of upstream device register 302, i.e., the address '00001' of scanner 2 to bit positions 0 through 4 of data bus 32-6, and gate 428 passes the A code '010' (see Table IV) stored in A code register 422 to bit positions 5 through 7 of data bus 32-6.

In I/O adapter 2A of scanner 2, since the mode signal has been generated on line 32-5 by I/O adapter 6A, gate 434 in FIG. 10B is enabled to pass the device address and control code on data bus 32-6 into register 436, as well as in other I/O adpaters and SMAC 18. Since the device address output from I/O adapter 6A is the address of scanner 2, only address comparator 438 of I/O adapter 2A generates the equal signal on line 440. Control code decoder 442 decodes the A code, partially conditioning AND circuit 448, and generates the valid code signal on line 452. When the strobe pulse is generated by SMAC 18, gate 450 is enabled to pass the equal signal to AND circuit 448, causing AND circuit 448 to generate the A Code In. This sets latch 560 in FIG. 12B, thus sending the write ready signal to processing element 600, i.e., scanner 2. The strobe pulse on line 32-3 also resets the A code out request latch (502-4) of I/O adapter 6A. AND circuit 454 of I/O adapter 2A generates the ACK signal in response to the equal signal and the valid code signal, informing I/O adapter 6A of the reciept of a valid control code. This completes the first SMA cycle.

When scanner 2 is ready for writing, that is it has scanned a line (216 bytes), it generates a write request in response to the write ready signal and sets a write request latch (502-2). Since I/O adapter 10A continues to generate the SMA request signal during that time, the next SMA cycle would be assigned to I/O adapter 10A by the grant signal from SMAC 18 unless memory 16 is not busy when the first SMA cycle has been completed. Note that the SMA request of I/O adapter 10A is the A code out. Therefore, the A code is sent to I/O adapter 6A to provide the write ready signal to compressor 6 in the same manner as the above. However, since compressor 6 has no compressed data to be written into the second buffer area at the time, it does not generate the write request. The A code out request latch (502-4) of I/O adapter 10A is also reset when the strobe pulse is recieved from SMAC 18 after the A code out request is granted. Thus, request ring 508 of I/O adapter 10A resumes the shift operation as in I/O adapter 6A.

The only SMA request existing within the system is the write request of I/O adapter 2A after the A code out request of I/O adapters 6A and 10A have been handled. The content of the write request latch (502-2) in I/O adapter 2A is sent out as the SMA request signal through the selecting AND circuit (506-2) and OR circuit 506-12 as soon as the binary one within request ring 508 is shifted into the second bit position. SMAC 18 grants the request unless memory 16 is busy, causing a write grant signal to be generated from the granting AND circuit (516-2). Since the write request is handled in the data mode, mode line 32-5 is not activated. The write grant signal is applied to gates 330, 344 and 352 of register array element 300 (FIG. 9), causing a first data byte loaded into write data register 308 from scanner 2 to be output to data bus 32-6, the five lower bits of the address of CPR 0 loaded into W-CPR register 314 to be output to bit positions 2 through 6 of control byte bus 32-4, and the BCC of the first buffer area loaded into W-BCC register 318 to be output to BCC bus 32-9, respectively. Further, the write grant signal sets bit 0 latch 402 in FIG. 10A to cause '1' to be output to bit position 0 of control byte bus 32-4 through gate 408 which is enabled by the grant signal from SMAC 18. Although not shown in FIG. 10A, bit 1 latch 404 and bit 7 latch 406 have been reset by the POR from processor 12. Therefore, '0' is output to each of bit positions 1 and 7 of control byte bus 32-4. Scanner 2 loads the next data byte into write data register 308 in response to the write grant signal.

SMAC 18 starts writing into the first buffer area in memory 16 based on the above information from I/O adapter 2A. Referring to FIGS. 6A and 6B, gate 90 is enabled by the grant signal to pass bits 2 through 6 of the control byte, i.e., the five lower bits of the address of CPR 0 into bit positions 1 through 5 of TAR 52, respectively, and to pass bits 0, 1 and 7 to control byte decoder 60. The data byte on data bus 32-6 is sent to parity checker 98 through gate 92 which is enabled by the grant signal. Error handling upon the generation of error signal from parity checker 98 has already been explained with reference to FIG. 8B. It is assumed hereinafter that no parity error has occurred. At this time, gate 104 for writing data has not been enabled yet. The BCC '100' of the first buffer area is sent to boundary detector 78 through gate 94 via BCC bus 32-9.

Control byte decoder 60 decodes the control byte in which only bit 0 is '1', and activates a line representing a memory write in decoder output bus 60A. In response thereto, table control 50 loads '0' (specifying a primary CPR) into bit position 0 of TAR 52 via line 54, causes pointer table 20 to be in the read condition so that the content of CPR 0, i.e., x'1028' is read out into address counter 22, and further generates a memory access signal which is on and a memory R/W signal which is off. The memory access signal enables gates 74 and 76 to pass the address x'1028' in address counter 22 to memory 16 and boundary detector 78. Since x'1028' is the access start address of the first buffer segment of the first buffer area and a segment boundary has not yet been reached, boundary detector 78 does not generate the end signal. The memory access signal being in on state and the memory R/W signal being in off state condition AND circuit 102. Gate 104 is thereby enabled to pass the data byte on data bus 32-6 to memory 16. Thus, the first data byte from scanner 2 is written into x'1028' of the first buffer area of memory 16.

Strobe generator 86 generates a strobe pulse on line 32-3 near the end of the SMA cycle. The write request latch (502-2) of I/O adapter 2A is reset in response thereto. However, scanner 2 still has data to be written into the first buffer area, and latch 560 (FIG. 12B) remains set. Thus, the write request is generated again to set the write request latch (502-2). In SMAC 18, strobe generator 86 generates an increment trigger signal on line 88 at the end of the strobe pulse. Since line 62B which inhibits the incrementation is not active, increment control circuit 80 increments the content of address counter 22 by one in response to the increment trigger signal on line 88. As a result, the content of address counter 22 becomes x'1029'. To return the incremented address x'1029' into CPR 0, table control 50 establishes the write condition of pointer table 20 and generates gate control signals G1 and G2. x'1029' is thus written into CPR 0 using the table address of CPR 0 which has been loaded into TAR 52.

I/O adapters 6A and 10A do not generate an SMA request until scanner 2 has completed writing into the first buffer segment of the first buffer area. Therefore, scanner 2 can continue to write into the first buffer area in the same manner as described above unless memory 16 is busy. During the writing, CPR 0 is incremented by one every time a data byte is written. When the memory address read out of CPR 0 into address counter 22 becomes the last address x'10FF' of the first buffer segment of the first buffer area, boundary detector 78 generates the end signal on line 32-10. The next address returned to CPR 0 is x'1100'.

In response to the end signal, I/O adapter 2A generates the P code out request for informing I/O adpater 6A that the read operation is now possible and the restore low W request for restoring the low byte of CPR 0 for writing to x'28', as explained with reference to FIG. 12A. Segment counter 552 is incremented to one. These requests set the P code out request latch (502-3) and restore low W request latch (502-7), respectively. Further, the P code out request from AND circuit 550 resets latch 560 in FIG. 12B to prevent the write ready signal from being sent to scanner 2.

If the binary one within request ring 508 of I/O adapter 2A exists between bit positions 4 and 7 inclusive, the restore low W request is first selected. Otherwise the P code out request is selected. It is assumed that the P code out request is selected. The content of the P code out request latch (502-3) is sent out on request line 32-1 as the SMA request signal through the selecting AND circuit (506-3) and OR circuit 506-12. Upon receipt of the grant signal from SMAC 18, the internal grant signal is generated on line 514 to cause the granting AND circuit (516-3) to be conditioned to generate the P code out grant signal. The P code out grant signal enables gate 326 in FIG. 9 to pass the address of compressor 6 stored in downstream device register 304 to bit positions 0 through 4 of data bus 32-6, and further enables gate 426 in FIG. 10B to pass the P code stored in P code register 420 to bit positions 5 through 7 of data bus 32-6. Since the P code out request (request 3) is handled in the control mode, OR circuit 516-12 in FIG. 13 generates the mode signal.

Although SMAC 18 and each I/O adapter receive information on data bus 32-6 in response to the mode signal, the device address included therein is for compressor 6 so that AND circuit 446 associated with control code decoder 442 (FIG. 10B) of I/O adapter 6A is conditioned to generate P Code In, and AND circuit 454 generates the ACK signal. In I/O adapter 6A, post counter 520 (FIG. 12A) is incremented to one by the P Code In. As a result, AND circuit 526 is conditioned and OR circuit 528 generates the A code out request to set the A code out request latch (502-4). Further, the output of zero detector 562 in FIG. 12B is turned off and the read ready signal is generated from inverter 564. Although the write ready signal is also provided to compressor 6 in addition to the read ready signal, compressor 6 generates the read request only to set read request latch 506-1 since there is still no data to be written.

In I/O adpater 2A, the P code out request latch (502-3) is reset by the strobe pulse from SMAC 18 after the P code out grant signal is generated.

Thus, the restore low w request of I/O adapter 2A, and the A code out and read requests of I/O adapter 6A exist witin the system. The positin of binary one within each request ring 508 of I/O adpaters 2A and 6A determines the particular request generated as the SMA request signal.

It is now assumed that the selecting AND circuit (506-7) of I/O adapter 2A is first conditioned to select the restore low w request. SMAC 18 generates the grant signal on line 32-2 unless memory 16 is busy, in response to the request. As a result, in I/O adapter 2A, the internal grant signal is generated on line 514 and thus the granting AND circuit (516-7) is conditioned to generate the restore low W grant siganl. Simultaneously, OR circuit 516-12 of request decoder 516 generates the mode signal. The restore low W grant signal enables gates 328 and 344 in FIG. 9 and gate 432 in FIG. 10B to thereby pass the address of SMAC 18 and the control code '001' (see Table III) to bit positions 0 through 4 and 5 through 7 of data bus 32-6, respectively, and to pass the five lower bits of the table address of CPR 0 to bit positions 2 through 6 of control byte bus 33-4. Although the content of latches 402, 404 and 406 in FIG. 10A (only bit 0 latch 402 has been set) are sent out to bit positions 0, 1 and 7 of control byte bus 32-4, SMAC 18 ignores these three bits since the mode signal is on line 32-5.

In SMAC 18, the five lower bits of the table address of CPR 0 are loaded into bit positions 1 through 5 of TAR 52 through gate 90 which is enabled by the grant signal, and the device address and the control code are sent to address comparator 110 and gate 112, respecitvely. Address comparator 110 generates the equal signal on line 114 to enable gate 112, causing bits 5 through 7 of data bus 32-6 to be passed to control code decoder 62. Control code decoder 62 decodes these bits and activates a line for specifying low byte restoring in decoder output bus 62A, increment inhibit line 62B, and valid code line 32-7. If the control code sent to control code decoder 62 is invalid, the ACK signal is not generated. This status is detected by AND circuit 236 and inverter 234 (FIG. 8B) of I/O adapter 2A when the strobe pulse is generated, and the interrupt signal is sent to processor 12. The strobe pulse on line 32-3 also resets the restore low W request latch (502-7) of I/O adapter 2A.

Table control 50 ignores the signals on decoder output bus 60A because of the active mode signal on line 32-5, loads '1' in bit position 0 of TAR 52 (specifying a secondary CPR or CPR 32) in response to the signal on decoder output bus 62A calling for low byte restore, and establishes the read condition of pointer table 20. Then, the access start address x'1028' of the first buffer area stored in CPR 32 is read out to address counter 22. Since increment control circuit 80 is inhibited from generating the +1 signal by the increment inhibit signal on line 62B, the address loaded into address counter 22 remains unchanged. Then, table control 50 loads '0' in bit position 0 of TAR 52, establishes the write condition of pointer table 20 and generates gate control signal G2. Thus, address x'28' is written into the low byte position (bits 8 through 15) of PR 0. With the high byte positions (bits 0 through 7) having x'11', CPR 0 now contains the access start address x'1128' of the next buffer segment.

The read request of I/O adapter 6A is selected when the binary 1 is shifted into the first bit position of request ring 508, and then granted unless memory 16 is busy. The read grant signal from granting AND circuit 516-1 enables gates 332, 340 and 350 in FIG. 9, and further resets bit 0 latch 402 in FIG. 10A. Thus, the five lower bits of the table address of CPR 1 are output to bit positions 2 through 6 of control byte bus 32-4, each of bit positions 0, 1 and 7 is set to '0', and the BCC of the first buffer area is output to BCC bus 32-9.

In SMAC 18, table control 50 sets bit position 0 of TAR 52 to '0' and establishes the read condition of pointer table 20. However, control byte decoder 60 generates a decode signal specifying the memory read at this time and, thus, table control 50 generates the memory R/W signal wiht a one state. This enables gate 106. It should be recalled that CPR 1 has been loaded with the access start address x'1028' of the first buffer area. Therefore, the first data byte written from scanner 2 is read out of memory 16 to bus 30, in response to this address as well as the memory access signal and the memory R/W signal from table control 50. This data byte is transferred to data bus 32-6 through gate 106. Read data register 310 of I/O adapter 6A latches the data byte on data bus 32-6 in response to the strobe pulse from SMAC 18 and sends it to compressor 6. Also, read request latch 502-1 of I/O adapter 6A is reset by the strobe pulse and request ring 508 resumes the shift operation.

In I/O adapter 6A, the A code out request is next selected when the binary one within request ring 508 is shifted into the fourth bit position. This request is handled in the same manner as described above, and the A code is sent to I/O adapter 2A. In I/O adapter 2A, latch 560 in FIG. 12B is set again to send the write ready signal to scanner 2 after the A code is decoded. After having scanned the next line, scanner 2 generates the write request in response to this siganl to set the write request latch (502-2) and loads a first data byte into write data register 308. In I/O adapter 6A, post counter 520 remains at one so that compressor 6, in response to the read ready signal from inverter 564, generates again the read request, after having saved the first data byte from the first buffer area, to set read request latch 506-1. Now only the write request of I/O adapter 2A and the read request of I/O adapter 6A exist in the system. Therefore, the writing from scanner 2 into the second buffer segment of the first buffer area (CPR 0 has been restored to x'1128') and the reading from the first buffer segment of the first buffer area into compressor 6 are alternately performed in a like manner as described above.

When the second buffer segment has been filled with data from scanner 2, I/O adapter 2A generates again the restore low W request and the P code out request. On the other hand, when compressor 6 has read all the data bytes in the first buffer segment, I/O adapter 6A generates the restore low R request and simultaneously decrements post counter 520 by one (refer to FIG. 12A). The restore low W request and the P code out request have already been explained. The restore low R request of I/O adapter 6A is similar to the above restore low W request except that the content of R-CPR register 312, i.e., the five lower bits of the table address of CPR 1 are output to bit positions 2 through 6 of control byte bus 32-4 in response to the restore low R grant signal from a corresponding granting AND circuit (516-5). The secondary CPR accessed by table control 50 is CPR 33 and its low byte x'28' is restored into the low byte position of CPR 1.

Compressor 6 compresses the data read out of the first buffer area according to a predetermined algorithm and then generates the write request if it is ready to write the compressed data into the second buffer area. CPR 2, which is specified by W-CPR register 314 of I/O adapter 6A, and the BCC of the second buffer area, stored in W-BCC register 318, are used to write the data from compressor 6 into the second buffer segment of memory 16.

When data written from scanner 2 has reached the last address x'13FF' of the first buffer area, I/O adapter 2A generates the P code out request to set the P code out request latch (502-3). Note the segment counter 552 is incremented to four at this time. Therefore, I/O adapter 2A also generates the restore double W request to set the restore double W request latch (502-8). If the restore double W request is granted, table control 50 of SMAC 18 generates the gate control signals G1 and G2 to cause the address x'1028' retained in CPR 32 to be written into CPR 0. Except for the above, the same operations as in the restore low operation are carried out. However, the control code to be sent from I/O adapter 2A to SMAC 18 should be '010'. In I/O adapter 6A, segment counter 542 is incremented to four when the last address x'13FF' is reached during the read operation, and thus the restore double R request is generated. In this case, the double bytes (x'1028') of CPR 33 are restored into CPR 1.

If the value of post counter 520 of I/O adapter 6A reaches four for some reason which may not be signaled to processor 12, OR circuit 528 does not generate the A code out request since the output of N (four) detector 522 becomes active. This prevents scanner 2 from writing into the first buffer area.

The output of N detector 522 sets latch 520. Therefore, if a certain buffer segment has been read out to compressor 6 with the value of post counter 520 remaining at four, AND circuit 532 is conditioned by the outputs of latch 530 and AND circuit 538 to generate again the A code out request.

In I/O adapter 6A, '0' is applied to the third input of AND circuit 556 in FIG. 12A. Therefore, the restore low W request is never generated even when each boundary of the first to third buffer segments is reached during the writing from compressor 6 into the second buffer area. In I/O adapter 10A, '0' is applied to both AND circuits 546 and 556. A data transfer from compressor 6 to communication device 10 is accomplished in the same manner as the transfer from scanner 2 to compressor 6 except that the second buffer area is used, and low byte restoring is not required. It should be noted, however, that the compressor to communication device transfer may be initiated before the scanner to compressor transfer has been completed. In other words, it is possible that the write request of I/O adapter 2A, the read and write requests of I/O adapter 6A, and the read request of I/O adapter 10A exist simultaneouslsy. Which request is granted is determined by the position of the binary one in request ring 508 of each I/O adapter and the connection scheme of grant line 32-2. Each of the control code output requests is granted in the same manner.

ENDING SEQUENCE

Scanner 2 generates the E code out request after scanning of the last line of the document to be transmitted is completed and all the data thereof are written into the first buffer area. In I/O adapter 2A, AND circuit 566 shown in FIG. 12B is never conditioned so that scanner 2 does not receive the EOP signal. Therefore, scanner 2 is constructed to automatically generate the E code out request as soon as all the scanned data of the last line has been written. With latch 570 being set, the E code out request sets the E code out request latch (502-9) through AND circuit 572. Therefore, when the binary one within request ring 508 reaches the ninth bit position, the corresponding selecting AND circuit (506-9) is conditioned.

If the E code out request is granted, gate 326 in FIG. 9 and gate 424 in FIG. 10B are enabled by the E code out grant signal from the granting AND circuit (516-9) to send the E code to I/O adapter 6A. Further, the E code out request from scanner 2 sets interrupt request latch 240 through OR circuit 238 of PIO control element 200 and, also, is loaded into a corresponding bit position of status register 224. If the IO line is not active at this time, AND circuit 242 generates the interrupt request to processor 12. After accepting the interrupt request, processor 12 outputs the Sense command on the IOBO following the device address. As a result, processor 12 knows that the operation of scanner 2 has been completed.

In I/O adapter 6A, AND circuit 566 is not conditioned unless the value of post counter 520 reaches zero, even when the E code is received from I/O adapter 2A and latch 568 in FIG. 12B is set thereby. Compressor 6 continues reading until post counter 520 reaches zero. With post counter 520 reaching zero, the EOP signal is generated from AND circuit 566, but the E code out request would not be generated at that time since, in most cases, compressor 6 still has some data to be written into the second buffer area. Compressor 6 generates the E code out request after having written the last byte of the compressed data into the second buffer area. The rest of the operation is the same as in the case of scanner 2. Communication device 10 generates the E code out request after having output all the data from the second buffer area to a communication line. However, the E code out request latch (502-9) in I/O adapter 10A is not set since AND circuit 572 is never conditioned. Note that communication device 10 does not have a downstream device and latch 570, therefore, remains reset.

Processor 12 knows by the Sense command that the operations of scanner 2, compressor 6 and communication device 10 have been completed, and then sends the Disable command to I/O adapters 2A, 6A and 10A to stop the operations of scanner 2, compressor 6 and communication device 10 and to reset various circuits therein.

RECEIVE AND LOCAL COPY OPERATIONS

In a receive operation, communication device 10 interrupts processor 12 for data transfer, in response to a transmit start signal from a remote facsimile system or switching apparatus. Then, a transfer from communication device 10 to decompressor 8 through a first buffer area and a transfer from decompressor 8 to printer 4 through a second buffer area are carried out without the intervention of processor 12, in a manner similar to that in the transmit operation. '0' would be applied to adapters 4A, 8A and 10A if the low bytes of primary CPR's need not be restored.

In a local copy operation wherein printer 4 is operated as a conventional copier, data is transferred from scanner 2 to printer 4 through a single buffer area. In that case, compressor 6, decompressor 8 and communication device 10 are not used, but low byte restoring is required.

While the data processing system according to the present invention has been explained with respect to particular embodiment of facsimile system, it should be understood by those skilled in the art that the present invention is not restricted thereto and may be applied to an ordinary data processing system including a plurality of I/O devices and terminals. In the latter system, however, the sequence of data transfers, i.e., the relationship between upstream and downstream devices is not fixed in general unlike the facsimile system. Therefore, a functional device requesting the data transfer would have to inform the processor which devices are designated as the upstream and downstream devices. This may be accomplished by loading a device address together with a flag for indicating either upstream or downstream into data register 226 shown in FIG. 8A, and reading its content by the Read command from the processor. The processor identifiers the functional device requesting the data transfer when the interruption is accepted.

Further while I have illustrated and described the preferred embodiment of my invention, it is understood that I do not limit myself to the precise constructions herein disclosed and the right is reserved to all changes and modifications coming within the scope of the invention as defined in the appended claims.

What is claimed is:

1. In a data processing system having a processor with a memory, a plurality of functional devices initialized by said processor, a buffer memory shared by all of said functional devices for buffering data transfered between said functional devices, shared memory access means for controlling writing from a selected functional device into said shared buffer memory and reading from said shared buffer memory into another selected functional device, wherein said shared memory access means includes a pointer table having a plurality of entries each capable of retaining an address for said shared buffer memory and wherein said processor initializes, in response to a data transfer request from a functional device, said pointer table, and first and second functional devices active in said data transfer, the improvement comprising:

said functional devices having means for generating one or more control codes representing access status for said shared buffer memory;

said control codes include a first code representing that said buffer memory is available for writing and a second code representing that said shared buffer memory is available for reading; and said active functional devices, after being initialized by said processor, transferring data between each other through said shared buffer memory under control of said shared memory access means and independent of said processor by interchanging said control codes with each other, said first active device enabling said shared memory access means to control the transfer of data from said first active device to said buffer memory when said first code is received from said second active device, said second active device enabling said shared memory access means to control the transfer of data from said buffer memory to said second active device when said second code is received from said first active device.

2. The data processing system of claim 1, wherein said first active functional device is defined as an upstream device writing into said shared buffer memory and said second active functional device is defined as a downstream device reading from said shared buffer memory.

3. The data processing system of claim 2 wherein:
said shared buffer memory is logically divided into a plurality of memory segments;
said downstream device sends said first code to said upstream device if one or more segments are empty; and
said upstream device sends said second code to said downstream device every time one of said segments has been written.

4. The data processing system of claim 3, wherein:

said upstream device generates a write request in response to said first code; and said downstream device generates a read request in response to said second code.

5. The data processing system of claim 4 and in addition said downstream device further comprises:

count means for indicating a second code count equal to the number of second codes received less the number of segments read out; and means, responsive to a predetermined maximum in said second code count, for inhibiting the sending of said first code to said upstream device so that said upstream device will no longer generate a write request.

6. The data processing system of claim 5 and in addition said downstream device further comprises:

means, responsive to a zero second code count, for inhibiting the generation of a read request.

* * * * *